United States Patent [19]

Brachet

[11] 4,293,385

[45] Oct. 6, 1981

[54] SECONDARY COOLANT CIRCUIT FOR NUCLEAR-REACTORS

[75] Inventor: Alain Brachet, Orsay, France

[73] Assignee: Electricite de France (Service National), Paris, France

[21] Appl. No.: 117,814

[22] Filed: Feb. 1, 1980

[30] Foreign Application Priority Data

Feb. 9, 1979 [FR] France ............................... 79 03335
Mar. 15, 1979 [FR] France ............................... 79 06595

[51] Int. Cl.³ ............................................. G21C 15/00
[52] U.S. Cl. .................................... 376/283; 376/404; 376/405
[58] Field of Search .................... 176/65, 64, 87, 49; 60/644

[56] References Cited

U.S. PATENT DOCUMENTS

| | | | |
|---|---|---|---|
| 3,956,063 | 5/1976 | Johnson | 176/65 |
| 3,968,653 | 7/1976 | Cachera | 176/65 |
| 4,101,377 | 7/1978 | Berniolles | 176/65 |

Primary Examiner—Donald P. Walsh

[57] ABSTRACT

A secondary coolant circuit for a nuclear-reactor of the liquid-metal cooled type, said circuit comprising at least one intermediate exchanger mounted in the vessel of said reactor, outside said vessel a steam-generator for the exchange of calories between the secondary liquid-metal flowing through said secondary circuit and water-steam, at least one pump for circulating said secondary sodium and one tank for storing said secondary liquid-metal and recovering those products generated by a possible liquid-metal-water reaction in said steam-generator, said liquid-metal being likely to occupy the lowest possible level in said tank, said secondary coolant circuit being characterized in that said tank is situated at the lowest possible level in the nuclear installation, in that the lower extremity of the liquid-metal outlet duct of said steam-generator is directly dipped into said tank, in that, in said tank above the liquid-metal, is maintained an inert gas cover at such a pressure that it balances the liquid-metal pressure in the whole secondary loop, said tank, in addition, acting as the downstream ram-effect preventing tank for said steam-generator and as an expansion tank during the temperature variations of said liquid metal, and in that the rotor of said pump is situated above said lowest level.

15 Claims, 20 Drawing Figures

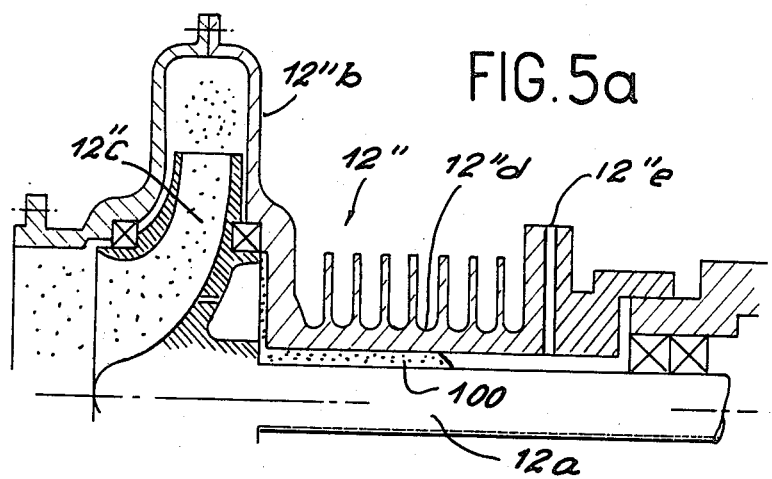
FIG.5a
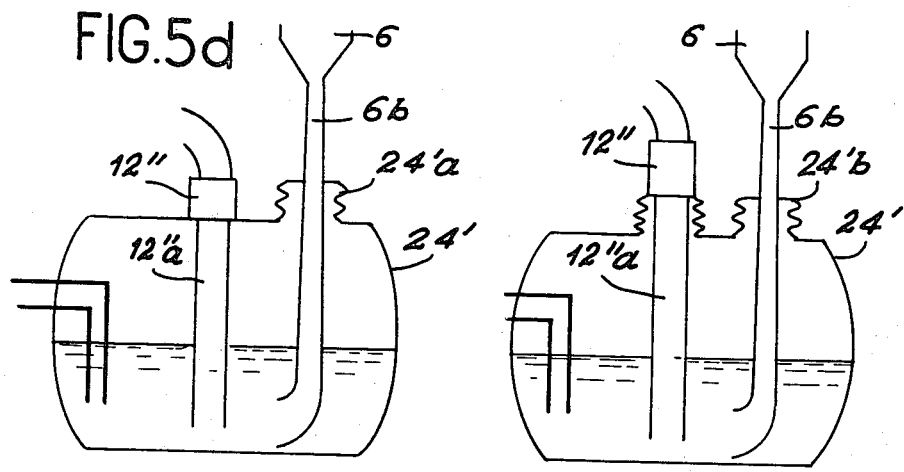
FIG.5d
FIG.5b
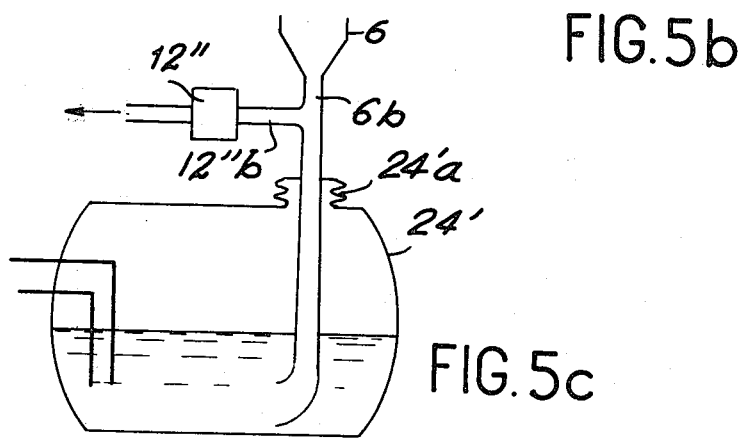
FIG.5c

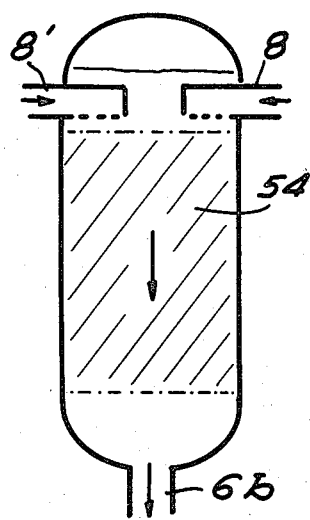
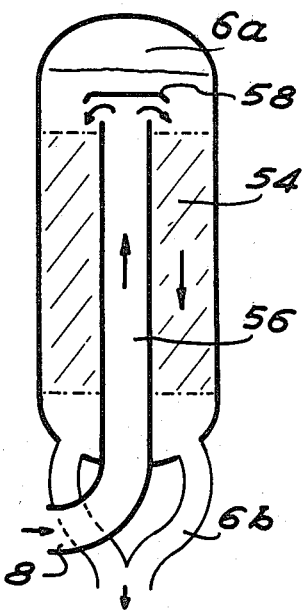
FIG.6a  FIG.6b
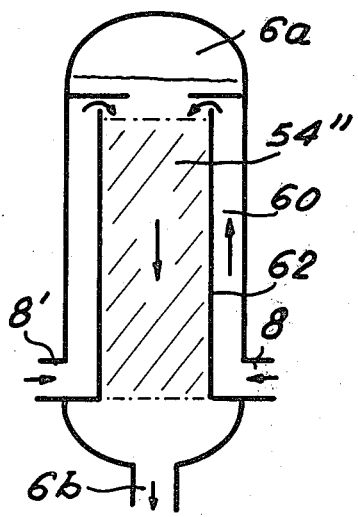
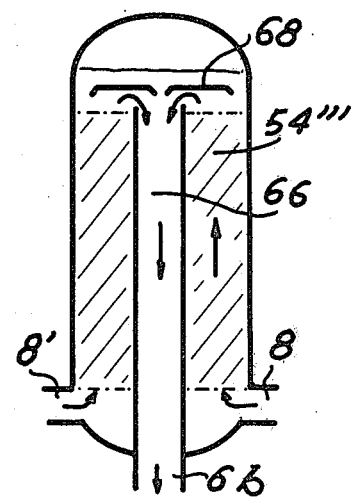
FIG.6c  FIG.6d

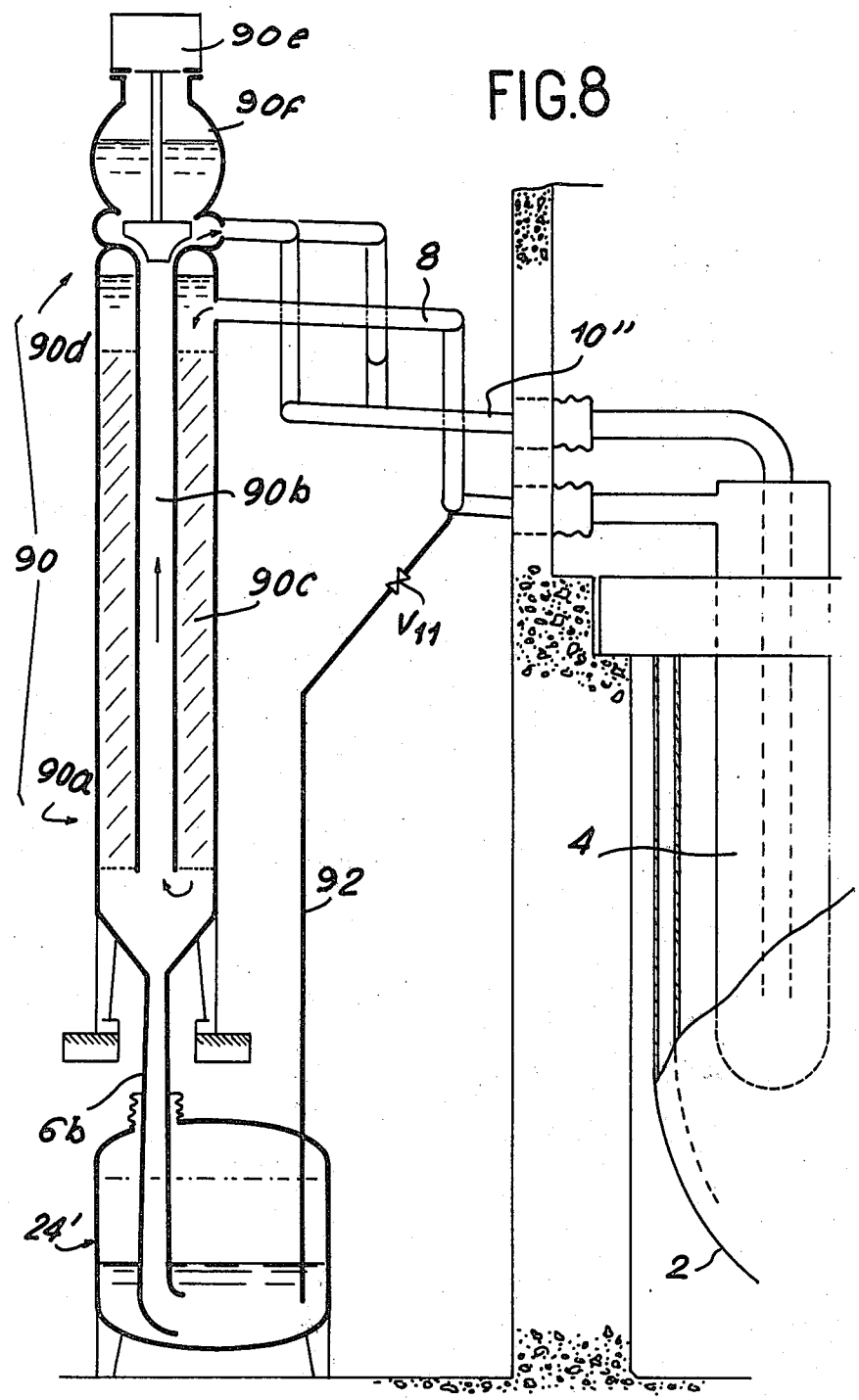

SECONDARY COOLANT CIRCUIT FOR NUCLEAR-REACTORS

The present invention relates to a secondary coolant circuit for nuclear-reactors of the liquide sodium cooled type.

In the present state of the art, fast neutron nuclear power plants resort to liquid sodium as coolant. The latter is usually placed in two successive coolantcircuit units. In the first circuit, so-called primary circuit, the sodium draws off the heat generated by the core fuel-elements and transfers said heat into a so-called intermediate heat-exchanger, wherein it is cooled and yields its heat to sodium contained in a second circuit unit, absolutely independent of said primary circuit, said second unit being called secondary circuit. In said secondary circuit, hot sodium issuing from the intermediate exchanger transfers heat into a further heat-exchanger, viz the steam-generator, in which the sodium yields its heat to pressurized water that vaporizes and finally serves to feed the current turbo-generator.

The secondary circuit is usually divided into several independent parallel mounted sub-circuits, or secondary loops. Said loops, three or four in number, are identical as regards the power transferred and their overall arrangement. If need be, it is possible to stop one of said loops and to cause the other loops to operate at rated power: the power delivered by the power-plant then decreases according to the power of the unused loop.

The adoption of the secondary circuit in said type of reactor aims at securely confining the radioactive primary sodium and at protecting the primary circuit from the possible sequels of a leak in the steam-generator thermal-exchange surface.

In fact, in such an occurence, water of high-pressure steam come into contact with the sodium. The resulting chemical reaction is highly exothermic and it releases corrosive and harmful reaction products (caustic soda, hydrogen). Accordingly, it is necessary to protect the core, i.e. the primary circuit, from the possible consequences of such a sodium-water reaction (ram-effects, pollution by soda).

In FIG. 1 is shown the usual structure of the cooling secondary loop of a fast reactor. The reactor vessel 2 contains the cooling primary circuit. In said vessel are to be found, in particular, intermediate exchangers 4 (two in number, in the present embodiment), the outlets of which are connected to steam-generator 6, through conduit pipes 8 and 8', respectively. In the upper portion thereof, the steam-generator comprises an argon pocket 6a defining a free level N of sodium. In said steam-generator 6, as mentioned above, there takes place an exchange between the secondary sodium and the water. The outlet of said steam-generator is connected, through conduit pipe 10, to the inlet of pump 12, the outlet of which are connected to the inlets of the intermediate exchangers 4, through conduit pipes 14 and 14', respectively.

The specific properties of liquid sodium have led to design sodium mechanical pump according to a particular technique. In particular, as regards the sealing packings across shaft 12a, it is usually resorted to a mechanical packing 16, the latter being in direct contact not with sodium, but with an inert gas (usually argon) interposed between the sodium and the packing. To this end, in the pump casing, it is necessary to provide a free level $N_1$ of sodium surmounted with an argon pocket. Vertical drive shaft 12a passes through the free surface and said argon pocket prior to reaching packing 16. In addition, it is necessary to take special measures in order that the level $N_1$ of sodium be prevented from rising up to the packing. The trick normally used in such cases consists in placing the pump in a so-called expansion tank 18, the name of which derives from the fact that it is usually large enough for absorbing all the possible volume increases of the volume of the secondary loop sodium, without drowning the packing. Moreover, by placing said tank right on top the circuit, one may be sure that, even in the event of leakage of the argon contained in the protective pocket, no drowning whatever of the packing would occur between tank 18 and the remaining portion of the loop, through an effect of comunicating vessels. In addition, with a view to prevent the sodium, should an unforeseen leakage of sodium to the atmosphere occur, from being released in the form of a high-pressure jet, great care is taken to limit the pressure in the secondary loop as much as possible. Considering the above described arrangement of expansion tank 18, such a restricting step consists in adjusting the pressure of the argon pocket of the latter to the smallest admissible value. The latter is equal to atmospheric pressure, plus a slight overpressure ensuring that any leakages that might take place would not lead to the introduction of air into the secondary loop.

In order to perform such an adjustment, there is provided a sodium make-up conduit pipe 20, opening into tank 18. Said pipe 20 comprises a circulating pump 19 and a device 21 for purifying sodium. An overflow conduit 22 is mounted on tank 18. Finally, an argon inlet 23 makes it possible to ajust argon pressure to a suitable value. Conduit 20 originates in a tank 24 for the storage of sodium and, if need be, the recovery of those products due to a sodium-water reaction in the case of a leak in steam-generator 6, a free level $N_2$ being maintained in said tank 24 through the introduction of an inert gas, e.g. argon, via duct 26.

As already mentioned, in a nuclear reactor of such a type, a violent sodium-water reaction may happen should there be a leak in the steam-generator, and the desire to fully protect the primary circuit thereform makes it necessary, in pracice, to provide the greatest possible protection of intermediate exchanger 4, constituting the only possible point of contact between said primary circuit and the secondary circuit.

In order to avoid such a risk, the following steps have to be taken:

(a) installation upstream and downstream of the steam-generator, of ram-effect preventing tanks, viz. tanks in direct communication with the secondary loop and having a free surface surmounted with an argon pocket. Should a sodium-water reaction occur, the pressure waves issuing from the steam-generator are largely damped in said tanks before reaching intermediate exchanger 4.

(b) installation, on the generator proper or in the immediate vicinity thereof, of large diameter diaphragms 28 rupturing through ram-effect and that uncover ports permitting to depressurize the secondary loop to the outside. In practice, with a view to avoiding an explosion resulting fron the reaction of hydrogen with the oxygen contained in the air and avoiding to contaminate the environment with sodium and soda, further diaphragms are mounted downstream, recovery tank 24 (described above) acting as a separator for the liquid and gas products, connected by duct 30. If need be, said tank is, in its turn, extended by a still more efficient second separator 32 (e.g. of the cyclone type) and by a stack 34 serving to the exhaust into the atmosphere of the gaseous products only (hydrogen, argon, steam, still loaded with a few soda aerosols).

An improvement usually resorted to for simplifying said system and reducing the cost thereof, consists in using the expansion tank of pump 18 as the downstream ram-effect preventing tank. As regards the upstream ram-effect preventing tank, a further improvement consists in making it coincide with the upper portion 6a of the steam-generator, in which, under such conditions, an argon pocket must be trapped. Finally, another improvement consists in using recovery tank 24 as the tank for storing the secondary loop sodium, whenever said loop has been stopped and drained. To that end, it is of course necessary, between the loop and tank 24, in addition to those ducts equipped with diaphragms, to provide a second network of drain pipes provided with large diameter valves (one has to be in a position to drain the secondary loop very quickly, in the occurrence of a leakage of sodium to the atmosphere in any portion of said loop).

Said network of ducts is constituted, in particular, by duct 36 associated to drain valves $V_1$ and $V_2$ putting tank 24 in communication with the secondary ducts 8 and 8', and by duct 38 associated to valve $V_3$ putting duct 10 in communication with said tank 24.

The thus-constituted installation, including the above-mentioned improvements, still comprises costly devices, and, in addition, entails obligations as regards its exploitation. Such is the case, in particular, as regards diaphragms 28. In practice, it is difficult to prevent the calibration of these diaphragms (viz. the pressure at which they are caused to rupture) from being altered in the long run (through age or because of creep and fatigue). One is thus led to contemplate replacing said membranes, e.g. every second or every third year, which, in addition, requires a sophisticated removable mounting, likely to induce sodium leakages. Finally, it is to be feared that, should a seism occur, the ram-effect provided by the latter in all the secondary loops simultaneously, would cause all the diaphrams to be ruptured. In such a case, the reactor would be deprived of its normal circuits for the exhaust of power, in particular of the residual power. In consequences of such a juncture would be so serious that it is necessary to provide duplicates of the means for exhausting residual power, said duplicates being independent of the secondary loops, in order to avoid such a risk.

FIG. 2 shows such an emergency cooling system according to the prior art.

Said system essentially comprises an extraexchanger E mounted in parallel with steam-generator 6. Said exchanger E is connected to ducts 8, 8' and 10 by means of ducts 8a, 8'a and 10a, respectively, duct 10a being connected to duct 10 by a mixer 10M. A portion of the secondary sodium main flow is thus deviated. The secondary portion of said exchanger E is constituted by an air-stack E', associated to a fan E'a.

It makes it necessary to install valves $S_1$, $S_2$ of very large diameters on the main pipes 8, 8' and 10, and mixers M for mixing sodium streams at different temperatures. Such devices are very expensive and they are the possible sources of failure and incidents, in particular as regards mixers M, the fully reliable operation of which is not yet ensured in the present state of the art. For reasons of safety, care is usually taken that the emergency exchanger be fed by the circuit pump, but also that it be possible to feed said exchanger through a thermosyphon effect or through natural convection, which necessitates that exchanger E be situated substancially higher than the intermediate exchangers.

Finally, theoretical calculations regarding propagation of the ram-effect following a sodium-water reaction, indicate that the hydraulic system constituted by the secondary loop with generator 6 provided with its diaphragm and surrounded by its two argon pockets, does not always permit, under the best conditions, to restrict the transmission of substantial overpressures to the intermediate exchangers. Moreover, such a hydraulic system does not readily prevent from contaminating the secondary loop by the reaction products, up to the intermediate exchanger. These facts can be diagrammatically and qualitatively explained in the following way: whenever a leak is initiated, the overpressure generated in the steam-generator induces an oscillatory movement of large amplitude and of fairly long period of the sodium between the two ram-effect preventing tanks. Therefore, instead of increasing continuously, the pressure at the level of the diaphragm is caused to fluctuate and it may happen that the amplitude and duration of the first pressure peak be in sufficient for rupturing the diaphragm. In such case, one should wait until the occurrence of the second peak, or even the third one, for obtaining rupture. Now, in the meantime, the leak continues to flow and to store pressure energy in the secondary loop. At the moment the diaphragm rupture takes place, since the pressure energy to be exhausted is more important, it takes more time for depressurizing the system. The concurrence of these phenomena tends to result in an increase of stresses at the level of the intermediate exchanger and an increased contamination of the circuit.

(c) as mentioned above, the rapid drainage of the secondary loop requires appropriate pipings and valves of large diameter, viz. expensive devices. Moreover, the presence of two upper points (the pump and the upper portion of the generator) and of two lower points (exchanger 4 and the lower portion of generator 6) makes it necessary to provide the drainage device at least in duplicates, since, as mentioned in FIG. 1, the presence of two parallel mounted exchangers 4, for instance, may render it necessary to duplicate the ducts for feeding them. Each of them will have to be provided with a duct and with a drain-valve (the latter being often duplicated for safety reasons). To the direct cost of those drains must be added obligations as regards the operation. Thus, when the circuit is in operation, any leak in the flap of these valves will induce a gradual drainage of the loop. In order to avoid the necessity of stopping a secondary loop, one is led to install the small circulating pump 19 for sodium leaks in storage tank 24. In its turn, said pump 19 entails obligations: as a protection against the risk of drowning the packings of main pump 12, it is necessary to provide a level regulation which, for safety reasons, will have to be reinforced by the return of sodium to the storage tank by means of overflow device 22. In any case, if the leak of the valves is too important, the operation of the loop has to be stopped.

Quite favorably, circulating pump 19 is normally used for extra purposes. In particular, it permits to fill the loop from the storage, after a certain down-time. Said pump may also be used for feeding the devices 21 for purifying sodium and regulating purity (cold traps, plugging indicators). During the filling operation, care must be taken that a false manoeuvre does not induce the drowning of the pump packing by an effect of communicating vessels between the two ram-effect preventing tanks, if the pressure therein is not suitable. In order to avoid such a risk, in addition to the already mentioned level and overflow adjustments, one takes care to place the upper portion of the generator (or the upstream ram-effect preventing tank) and the pump in the same horizontal plane. With a view to still more safety, the corresponding two argon pockets are connected by means of pipes 25 for balancing the levels and pressures. Of course, all these devices are very expensive and may be the cause of failures and entail obligations as regards exploitation.

(d) in order that the ram-effect preventing tanks be sufficiently efficient, one is led to give same a fairly large volume. Again, for certain transient regimes, if it is desired to prevent the sodium level from varying to a too large extent, expansion tank 18 must be given a large volume. As explained above, it is intended to absorb the thermal expansion of sodium without drowning the packing. In addition, it must absorb the sodium thermal contractions occurring, e.g. during an emergency stoppage of the reactor: a very fast cooling of the sodium and the related contraction thereof might proceed until the pump be unprimed through unwatering of its suction ports. In such a case, the circulating pump is not sufficient for compensating the volume due to the contraction of sodium, unless the expansion tank has a sufficient sodium supply. The latter tank, in which, in addition, the pump must be installed with sufficient clearance for preventing packing 16 from being drowned, as explained above, is a large, heavy and expensive tank.

In FIG. 3 is shown, with more accuracy, the installation of a secondary cooling circuit of the type of the one shown in FIG. 1. Similar or identical parts are designated by the same reference numbers in both figures. FIG. 3 also shows the lower floor 40 of the nuclear plant and the wall 42 defining the reactor confinement enclosure. The figure also shows the plug 44 of the nuclear reactor vessel 2, and, more diagrammatically, the means 12s for supporting pump 12 with its expansion tank 18, the means 6s for supporting steam-generator 6 and the means 24s for supporting storage and recovery tank 24.

The installation of a secondary loop according to the already described design requires a very large volume for the following two series of reasons:

(a) in order that the loop can be drained by gravity, which is the safer solution, the lowest point of the main pipes has to be situated fairly above the storage tank. It is necessary, indeed, to have enough room for containing the drain-valves, the drain-pipes and the expansion forks with which said pipes must be provided in order to accomodate temperature changes. The assembly constituted by the secondary loop and the storage tank therefore occupies much room in height, which entails costly supporting means and large buildings.

(b) main pipes 8, 8' and 10, in their turn, must be provided with expansion forks or with appropriate devices for compensating expansion. As regards the forks, it can be shown that the length of high temperature pipes to be mounted between two devices (more precisely, between two fixed points) is proportional to power 3/2 of the distance between said fixed points (said length is also proportional to the square root of the pipe-diameter). It can thus be seen from FIG. 3 that three fixed points have to be connected according to the three sides of triangle ABC. All the above enumereted obligations regarding installation contribute to lessen the possibility of reducing the length of the triangle sides by a large amount; thus, while it is possible to modify side BC, it is more difficult to simultaneously reduce AB and AC (coincident levels of the argon pocket, steam-generator supported preferably in the lower position, necessity of a drainage by gravity . . . ). Accordingly, the overall length of the pipes will have to be great, as shown, e.g. in FIG. 3, failing which numerous or large devices for compensating expansion will have to be provided.

Moreover, it can be seen that pump 12 is under poor suction hydraulic conditions, since it has a low NPSH coefficient (NPSH standing for "net position suction head"). In order to avoid cavitation in that pump, one is led to adopt a low velocity of rotation, therefore a large diameter wheel and a slow driving motor. The whole assembly is very expensive since, as is well known, the price of a pump increases according to the square of the diameter thereof.

In addition, the whole unit constituted by the motor-pump and the expansion tank is heavy. Since it occupies a high position in the installation, it requires important supporting means, in particular to avoid possible seismic stresses that tend to increase in proportion to the distance with respect to the groundlevel. No wonder therefore that, in various fast neutron power-plant designs, the overall price of the motor-pump, the expansion tank and the related supporting means, constitute a significant portion of the boiler overall cost.

In brief, the investment and working cost of a secondary loop according to the above described prior art, is unfavorably influenced by a few parameters bound to the usual design of said loops.

To sum up, the major drawbacks are as follows:

the pump is in high position; it has a poor NPSH coefficient; it rotates too slowly and it is therefore heavy and costly;

the expansion tank wherein the pump is normally installed, is heavy and bulky;

the above two assemblies, occupying high positions, lead to expensive supporting frameworks (in particular, in view of seisms);

the piping network is very long because of the existence of three fixed points to be connected, allowing few degrees of freedom for bringing same nearer to one another.

protection against water-sodium reaction is obtained exclusively by means of rupturable costly diaphragms, entailing obligations as regards safety (exhaust of the reactor residual power in case in an unforeseen rupture) and as regards maintenance (periodical changes). Such a protection is far from perfect (oscillatory movements of sodium);

the presence of valves and of large diameter drain-pipes that are expensive and are likely to induce failures (flap leaks);

the presence of various pipes for performing various functions connected with the above mentioned obligations: filling, overflow, level balance, . . . );

unfavorable influence of the above factors on the sodium volume of the loop and, accordingly, on the size of the sodium tanks that are at least two in number (expansion, storage);

unfavorable influence of the above on the volume occupied in the building (area at the ground level, height);

unfavorable influence of the above on the electrical devices for pre-heating pipes and the tanks and on the control.

The object of the present invention is precisely to provide a cooling secondary loop for fast neutron nuclear-reactors cooled by a liquid metal (sodium or a mixture of salts of liquid metals of the same type, obviating, or at least substantially decreasing the above mentioned drawbacks. In particular, the secondary loop forming the object of the present invention permits to achieve a substantial decrease of the space required for its installation; said secondary loop permits to cause the secondary pumps to operate under better conditions; it also permits, either to eliminate the safety diaphragms in the case of an explosive sodium-water reaction, or at least to render the action thereof less inmportant, through the addition of circuits adapted to ensure, in addition or exclusively, the exhaust of those products resulting from such a reaction, in order to protect the intermediate exchanger or exchangers of the secondary loop.

With a view to providing the above mentioned results and other results to be explained later on, the present invention relates to a secondary coolant circuit for a nuclear reactor of the liquid-metal cooled type, said circuit comprising at least one intermediate exchanger mounted in the vessel of said reactor, outside said vessel a steam-generator for the exchange of calories between the secondary liquid-metal flowing through said secondary circuit and water-steam, at least one pump for circulating said secondary sodium and one tank for storing said secondary liquid-metal and recovering those products generated by a possible liquid metal-water reaction in said steam-generator, said liquid-metal being likely to occupy the lowest possible level in said tank, said secondary coolant circuit being characterized in that said tank is situated at the lowest possible level in the nuclear installation, in that the lower extremity of the liquid metal outlet duct of said steam-generator is directly dipped into said tank, in that, in said tank above the liquid metal, is maintained an inert gas cover at such a pressure that it balances the liquid metal pressure in the whole secondary loop, said tank, in addition, acting as the downstream ram-effect preventing tank for said steam-generator and as an expansion tank during the temperature variations of said liquid metal, and in that the rotor of said pump is situated above said lowest level.

It can thus be seen that the recovery of the sodium-water reaction products can be achieved directly without the absolute need of diaphragms and, in addition, that the storage tank has also the function of a downstream ram-effect preventing tank for the steam-generator, whereby is eliminated a large volume tank in the secondary loop.

According to a preferred embodiment, the circulating pump can be of any type, and the inlet of said pump is connected to the outlet duct of said steam-generator upstream of said tank, whereas the outlet of said pump is directly connected to the intermediate exchanger or exchangers, the said pump being outside the said tank.

It can thus be seen that the pump is not dipped in the tank. In addition, it can be seen that the secondary circuit does not actually go through the storage tank. The sodium circulates directly from the exchanger to the pump. However, the circuit communicates with the tank. Said tank therefore does perform its "ram-effect preventing function", but there is normally no sodium flowing throughout the tank.

According to a second embodiment, the said circulating pump is of the free level type and the said pump is situated in said tank, the inlet of said pump being directly dipped into the liquid metal contained in said tank, whereas the outlet of said pump is directly connected to said intermediate heat-exchanger or to each of said intermediate exchangers.

According to a third embodiment, said pump is of the electromagnetic or "frozen seal" type, and said pump is situated just above said tank, the inlet duct of the pump being dipped into the liquide metal of said tank, whereas the outlet duct is directly connected to the intermediate exchanger or exchangers.

According to a fourth embodiment, said pump is integrated to said steam-generator and situated in the upper portion of its casing or envelope, said steam-generator being provided with a central stack through which flows the secondary metal after it has passed through the exchange bundle, the said central stack constituting the inlet duct of said pump, the outlet of said pump being directly connected to said intermediate exchanger or exchangers.

It can thus be seen that, in this latter case again, there is no liquid metal flowing through the storage tank.

However, when the circulating pump is of the mechanical level type, there arise problems in cases where that pump is brought to a standstill whether voluntary or unforeseen. More precisely, the problem involved is that of the introduction of the covering gas into the sodium circuit, when a pump of that type is being unprimed. The same problem arises even in those cases where the pump is situated in the storage tank since it is then a stub shaft pump, viz. the rotor or wheel of the mechanical pump is situated above the lowest level of sodium in the tank.

For a better understanding of that problem, FIG. 3' shows a free level mechanical pump.

The object of that figure is mainly to show the various possible types of sodium operational leaks likely to occur in such a pump.

The figure shows a supporting sleeve 120, passing through the wall of storage tank 24' and closed by a cover 122 provided with a sealing packing 12'a for pump shaft 12"a (that packing, represented at 12'a in FIG. 1, is not shown in FIG. 2). Sleeve 120 supports the pump flange 126 provided with its output ports 128, connected to the duct or ducts 10' of FIG. 1. Pump 12' also comprises a sodium sucking axial port 130, connected to suction duct 130' dipped into tank 24' under the lowest sodium level $N_2$. At the lower end of shaft 12"a is to be found the pumpwheel 132. About wheel 132 is a diffuser 134, in one piece with pump casing 136. Pump shaft 12"a penetrates into said casing 136 through a hydrostatic bearing 138. In the vicinity of said bearing 138, are to be found a chamber 140 for feeding said bearing and a chamber 140' into which penetrates a portion of the flow originating from the hydrostatic bearing (the other portion being directed towards the suction port of the pump via orifices in the wheel upper flange). With a view to providing a certain tightness, labyrinth seals 142 or seals with adjusted segments are to be found between casing 136 and sodium suction tubing 130' and between said casing 136 and the supporting sleeve 120. The object of such semi-tight devices is to restrict leaks $F_1$ between the static portions 136 of the pump and the supporting sleeve 120, so as to permit an easy dismounting from above of the whole assembly constituted by pump casing 136, wheel 132 and shaft 12"*a*. Other labyrinth joints, or joints with adjusted sealing rings, are provided between casing 136 and pump wheel 132, respectively. The corresponding leaks are designated by arrows $F_2$. Finally, leaks designated by arrows $F_3$ are mentioned in the figure, said leaks being related to the flow into and from hydrostatic bearing 138.

In addition, it should be stated that sleeve 120 for supporting the pump casing is provided with upper vents or ports 146, adapted to ensure the balance of argon pressure between the inside and the outside of said sleeve 120, said port 146 being situated higher than the highest level $N_3$ of sodium in tank 24' and, if need be, a second series of vents or ports 148 adapted to ensure the balance of sodium levels between the inside and the outside of sleeve 120, the ports of said second series 148 being situated preferably under the sodium highest level $N_3$.

It will be cleary understood that, when, taking account of the storage tank height, the pump shaft is long enough to allow the pump wheel to be under the lowest level of sodium, the possible operational leaks are by no means an inconvenience. On the other hand, when the pump shaft is very short (the wheel being above the lowest level), which is the case in the present invention, and when the pump comes to a stop in an unforeseen manner or when the speed thereof decreases under a given value, some of these operational leaks stop ejecting sodium and are even reversed so that argon penetrates into the pump casing, then from said casing into the very loop. If the stoppage is maintained, the pump is finally unprimed and the loop is in a position to be gradually drained. The same thing takes place when the mechanical pump is outside the tank. It may happen that such a drawback be tolerated, since it does not impair the normal operation of the installation but merely gives rise to extra intricacies during incidents such as e.g. an unforeseen stoppage of the pump. However, that drawback constitutes an obligation that does not exist in normal circuits. In addition, it can entail some risks as regards the safety of the installation, in particular if the secondary loops are used under every circumstance for evacuating the reactor residual power, as is the practice in various fast neutron power-station.

The simplest way to obviate that drawback without modifying the basic principle of the secondary circuit according to the invention consists in giving the argon circuit fairly large dimensions. Following an unforeseen stoppage of the pump, as argon bubbles penetrate into the loop and are driven by gravity to the argon pocket of the steam-generator, thus inducing the gradual drainage of the secondary circuit sodium, the level regulation of the generator argon pocket controls an equivalent introduction of argon into the storage tank, which thus permanently compensates for the flow escaping from that tank. The drawback of the method mainly lies in the bad consequencies of a permanent flow of argon through such a device. Indeed, the experience gained from a large number of liquid sodium circuits and from the related argon circuits indicates that it is of prime importance to prevent transfers of hot argon, loaded with steam and sodium aerosols, since they cause the pipes and the devices submitted to such gas flows to be frequently choked. A rule in the art therefore consists in restricting the movements of argon to no more than necessary.

A solution to that problem might consist in using a pump with a long shaft, in which case the pump wheel is situated under the sodium lowest level in the storage tank inspite of the height of the latter. Thus, the above-mentioned problems disappear. With such an arrangement, the pump operation no longer sets any problem of the type of those arising in the usual secondary circuits. However, with such a solution, the advantage that can be drawn from the fact that the NPSH coefficient is high, may be partially or wholly counterbalanced by an increase of the costs due to the fact that the pump shaft is much longer than in the usual devices and in view of the extra expenses resulting from the necessity of maintaining a sufficient supply of sodium at the tank bottom in order to drown the pump. Such a solution must therefore be rejected.

That is why, according to the present invention, improvements are provided that are connected to the installation of pumps with a short shaft in the storage tank or to the case of free level pumps situated outside of the storage tank, permitting to obviate the problem of undrowning the pump, even in case the latter is stopped, without substantially complicating the circuit.

According to those improvements, the secondary circuit in which the liquid metal occupies, in the storage tank, a lower level whenever said secondary circuit is filled with said liquid metal and a higher level whenever said secondary circuit is empty, is characterized in that the wheel of said mechanical pump is mounted, at the extremity of the shaft thereof, at an intermediate level between said lower level and said higher level, in that the said suction duct of the pump opens lower than said lower level and in that said pump is provided with protective means serving, when the liquid metal is at said lower level, to prevent the gas surmounting said liquid metal from penetrating into the back-flow duct of said pump, should the latter happen to be stopped.

According to a first embodiment, the said protective means consist in the fact that the said back-flow duct forms an elbow and has, in said storage tank, a low point situated under said lower level.

According to a second embodiment, the secondary circuit comprising a purification dependent circuit provided with its own pump through which the liquid metal flows, the inlet of said dependent circuit opening into the storage tank under said lower level, is characterized in that the protective means consist in that the outlet of said dependent circuit opens into the pump casing above said wheel, the flow-rate of said purification dependent circuit being greater than the flow-rate of the operational leaks of said pump, when the latter is stopped.

Of course, it is possible to combine the two types of protection.

According to another embodiment of the improvements applicable to the two ways of mounting mechanical pumps (inside or outside the storage tank), the system for avoiding the introduction of gas bubbles consists in that the back-flow duct or ducts connecting the outlet of said pump to said intermediate exchanger comprises an upper point, the slope of the portion of said conduit between the pump outlet and said upper point is sufficient and suitably directed to allow the gas bubbles likely to penetrate into said pump to be drained and return to said upper point by gravity, said upper point is provided with an orifice or vent permitting said bubbles to escape and means are provided for introducing an equivalent amount of gas into said tank so as to maintain said pressure.

Quite obviously, in cases where the pumps are contained in the storage tank, the latter protective means may be combined with the previously described protective means.

Other features and advantages of the present invention will appear from the following description of several embodiments, given nearly by way of examples, with reference to the following drawing, in which:

FIGS. 1 to 3', already described, represent a secondary loop of the prior art for liquid sodiumcooled nuclear-reactor;

FIG. 5a is a half-view, in longitudinal section, of a "frozen seal" secondary pump;

FIGS. 5b to 5d are partial views illustrating various ways of mounting the secondary pump;

FIGS. 6a to 6d are views showing various embodiments of the steam-generator;

FIG. 8 is a partial view of the secondary loop, showing an embodiment comprising an integrated pump-exchanger block;

Figure 1:
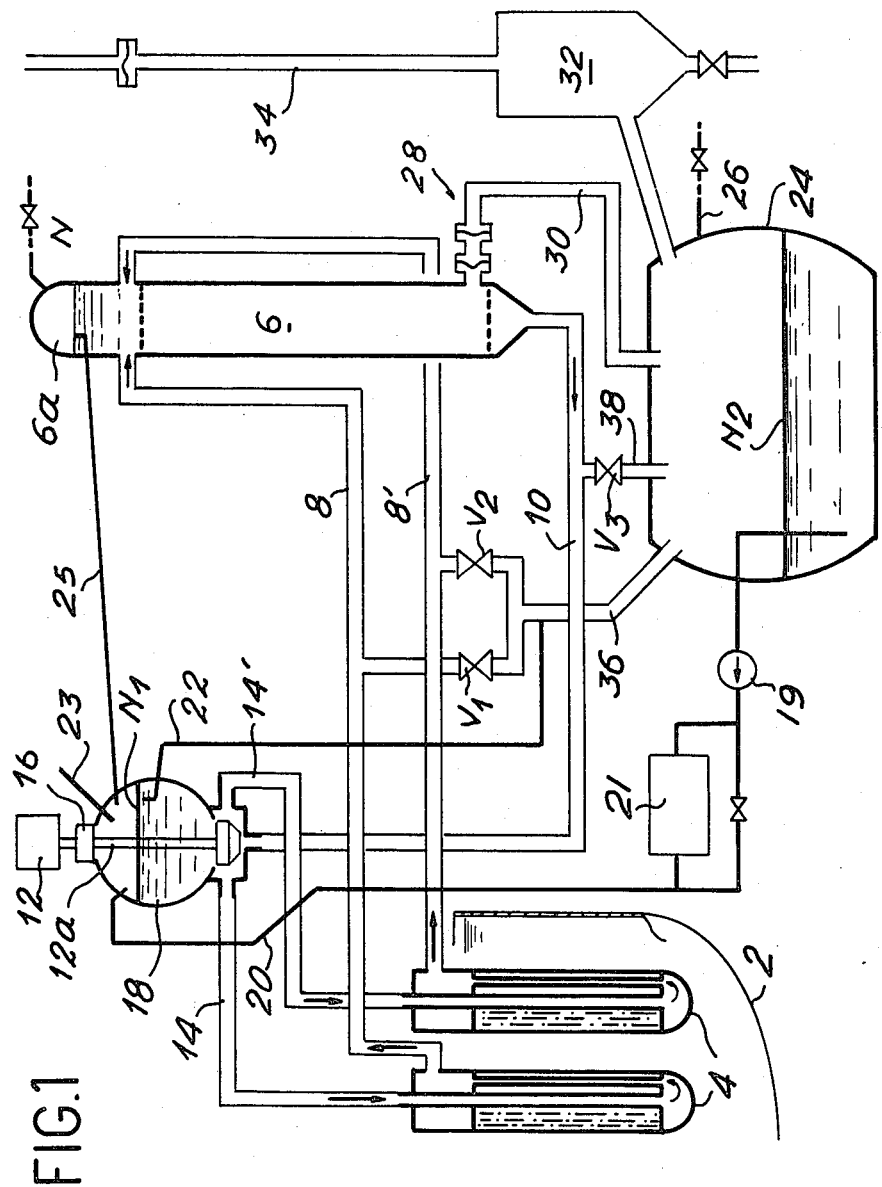
Figure 4D:
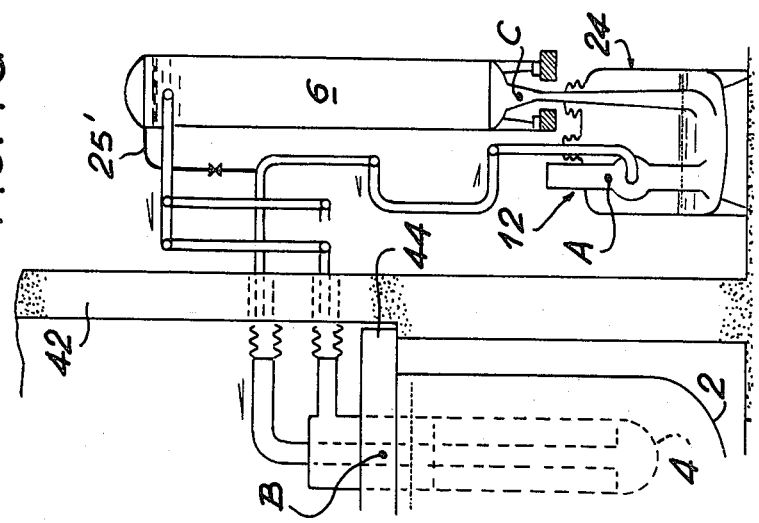
FIG. 4d shows the secondary loop in a concrete application.
Figure 4A:
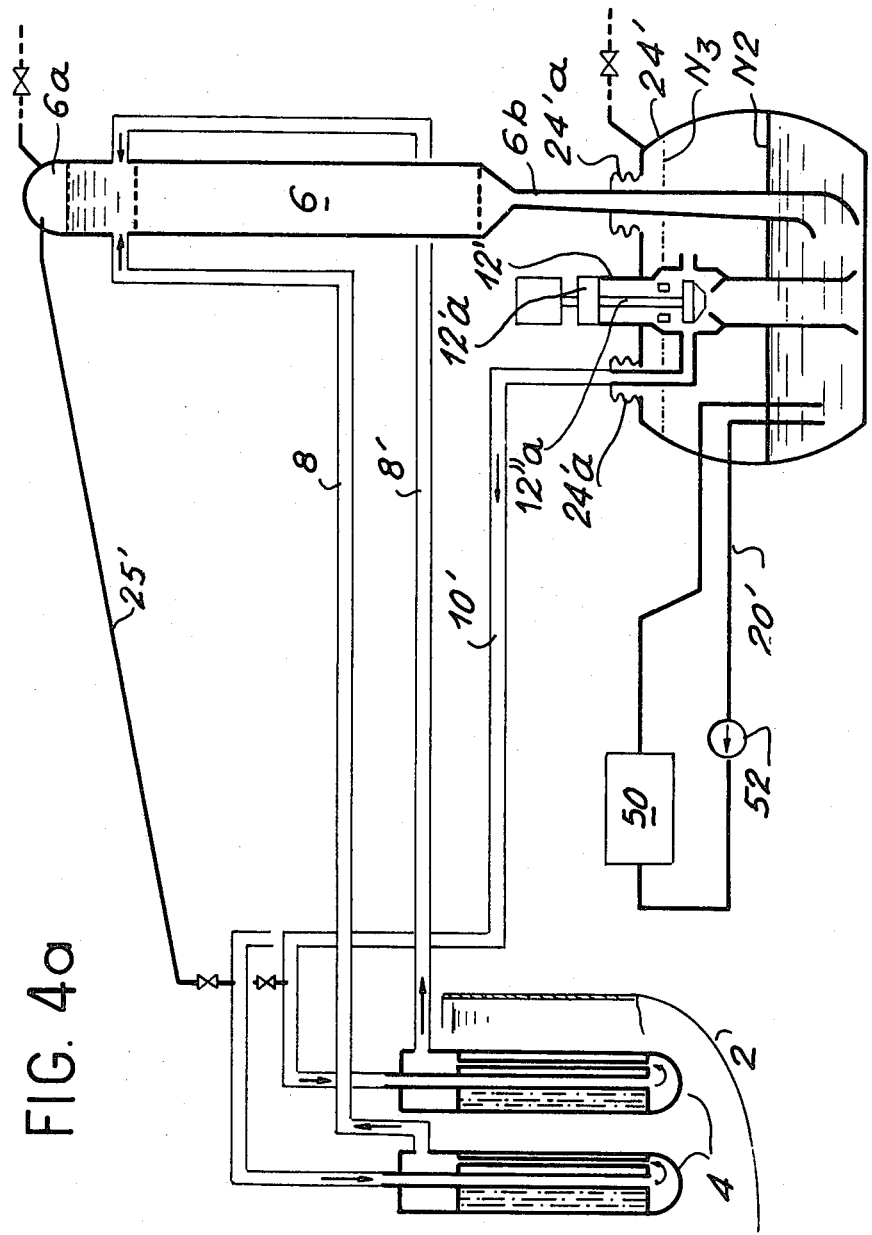
FIG. 4a is a simplified view of the secondary loop according to the invention, showing the main elements of the latter.

The secondary loop, such as shown in FIG. 4a, comprises the reactor-vessel 2 with intermediate exchangers 4 and its steam-generator 6 connected to the intermediate exchangers via ducts 8 and 8'. Steam-generator 6 is surmounted with its argon pocket 6a as in FIG. 1. There is also a storage tank 24' as in FIG. 1, but in a modified form. There is also a duct 10' corresponding to duct 10, connecting circulating pump 12' to the inlet of intermediate exchangers 4. With respect to FIG. 1, corresponding to the prior art, it must be noted that the outlet tubing 6b of steam-generator 6 opens directly into tank 24', and that pump 12', in the present case of the free surface type, is mounted inside tank 24'. The latter rests on the ground and therefore constitutes the lowest point of the nuclear plant. Therefore, pump 12' occupies a low position in the installation. In addition, circuit 20' permits to purify the sodium by picking up a portion thereof. Said circuit 20' essentially comprises a purification unit 50 of a known type and a circulating pump 52, usually of the electromagnetic type.

FIG. 4a thus represents a secondary loop with a free surface pump 12' installed in a low position in a large tank 24' assuming a storage function (when the loop is stopped), and an expansion function (for every mode of operation) and, in addition, acting as downstream ram-effect preventing tank and as a tank for the recovery of the products of a possible sodium-water reaction. Several tanks of the usual system are replaced by a single tank, the latter moreover occupying a low position. Pump 12' sucks sodium from that tank and repels it into exchangers 4. Sodium is then introduced through the generator upper extremity, where an argon pocket 6a has been provided. From that point, sodium flows downwards through the bundle of tubes. At the exit of the generator, the sodium is sent back to the single storage-expansion-recovery tank 24', via a duct 6b, the latter being as short and as upright as possible, in order to promote a rapid drainage (in particular, of the soda-contaminated sodium in the case of a sodium-water reaction) and to reduce the overall height of the system.

With a view to making up for the piping expansion between the pump and the tank wall and between the steam-generator and said tank, it is possible to provide expansion compensators 24'a at appropriate places. For reasons peculiar to the technique of sodium, said compensators 24'a are usually compensators with metal bellows. By placing said compensators in front instead of in direct contact with the sodium, as permitted by the arrangement of the secondary loop according to the invention, it is possible to obviate the usual drawbacks of said sealing devices when in direct contact with sodium. The position they occupy renders them perfectly reliable and safe and, should they happen to be ruptured, there would be no leakage of sodium to the outside. Indeed, the storage tank has been selected so as to be large enough to contain all the loop sodium, at the highest temperature expected, while maintaining, above free surface $N_3$, an argon pocket sufficient for preventing:

(1) the drowning of the packing of pump 12'a;

(2) the drowning of expansion compensators 24'a, if any.

In order to operate the system, the argon pressure inside tank 24' must compensate the head if sodium in the loop pipes and in the steam-generator. For a zero flow-rate of the sodium, the absolute pressure of the tank argon is therefore equal to the pressure inside pocket 6a of the generator (which, as explained above, should be hardly higher than atmospheric pressure), plus the pressure equivalent to the height of sodium within the loop with respect to the free surface in the storage tank. From most of the known generator designs, it can be assumed that said height of sodium will not be more than 30 m (100 ft) and, in any case, will be in the vicinity of that value: it is a moderate pressure, in perfect compliance with the rules concerning pressurized-gas devices for that type of circuit. It can be seen that, when the pump is in operation, the argon pressure inside the tank is smaller, since it is then decreased by the head-loss of sodium through the steam-generator (said head-loss being, e.g. of about 1 bar). It follows therefrom that the pressure of the tank argon is still smaller than when the loop is full and stopped. However, that pressure is still high enough for providing, at the pump inlet, a high NPSH coefficient, e.g. of about 2 or 3 absolute bars. Such a value is substantially greater than that obtained in the prior art (FIG. 1), where the pump is at the upper point (e.g. 1 to 1.3 bar). A substantial gain can be obtained on the pump rotation velocity and, therefore, on the cost thereof.

Figure 4C:
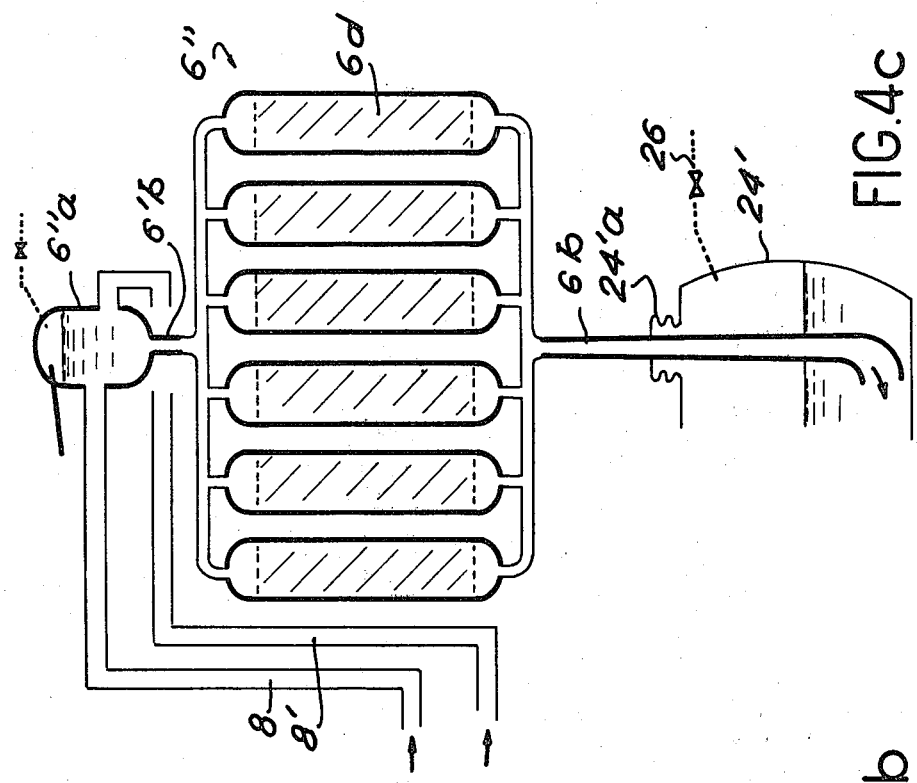
FIGS. 4b and 4c represent variants of the upstream ram-effect preventing tank.
Figure 4B:
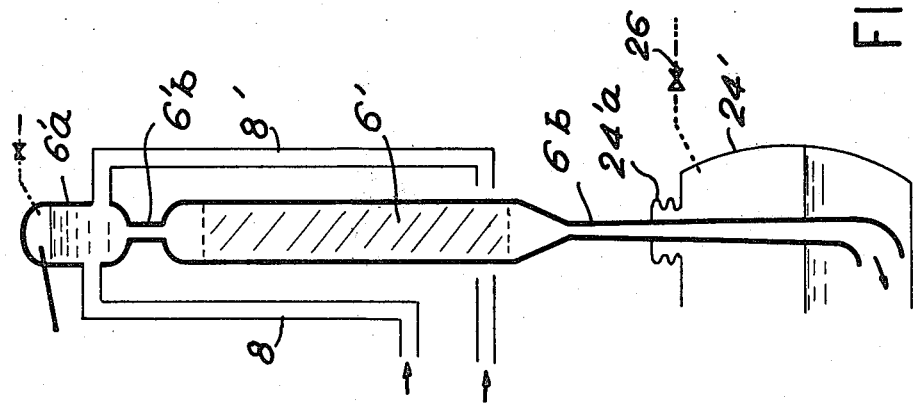

In FIGS. 4b and 4c are shown modified embodiments of steam-generator 6. In steam-generator 6' (FIG. 4b) argon pocket 6'a is spaced from the steam-generator outer envelope and connected to the inlet of said generator by means of duct 6'b. In other respects, the steam-generator is similar to that of FIG. 4a. In FIG. 4c, steam-generator 6" is of the modular type. As in the previous example, there is an argon pocket (6"a) spaced from the outer envelope; however, the heat-exchanger proper is constituted by a plurality of parallel-mounted modules 6d. In other words, the inlets of the exchange modules are all connected to duct 6'b, whereas the outlets are connected to duct 6b. In other respects, the two devices are similar.

In FIGS. 6a to 6d are shown various modes of circulation of the secondary sodium inside steam-generator 6 or inside one of the exchange modules of said steam-generator. In FIG. 6a is to be found the same arrangement as described with respect to FIG. 4b. In other words, the inlet tubes for secondary sodium are situated at the upper portion of the steam-generator outer envelope, and the secondary sodium flows from top to bottom the various exchange-tubes containing water, said tubes, designated by hatched portion 54, occupying the whole cross section of the heat-exchanger. The exit of cooled secondary sodium is through tubing 6b. In the case of FIG. 6b, the outer envelope of the steam-generator is provided with a central stack 56, connected to inlet tubing 8. Deflector 58 directs secondary sodium towards annular space 54' containing the exchange-tubes in which the water flows. The exit of cold secondary sodium takes place by means of a connection with outlet tubing 6b. Here again, therefore, there is a flow of secondary sodium from top to bottom.

In FIG. 6c, the sodium is introduced in the lower portion of the exchanger outer envelope, and it flows first in an annular space 60 defined between said outer envelope and a baffle 62 containing the whole system of exchange-tubes 54". Deflectors 64 are adapted to direct the sodium towards the upper portion of the bundle of exchange-tubes 54". The exit of cold secondary sodium takes place via outlet tubing 6b.

In FIG. 6d, hot secondary sodium is introduced through the lower portion of the steam-generator by means of ducts 8 and 8'. Said hot sodium flows through the bundle of exchange-tubes 54'", said bundle, in the present instance, forming a ring about a central exhaust stack 66. Once it has flowed through said bundle, the secondary sodium is directed towards stack 66 by deflectors 68. Said stack 66 is connected to outlet tubing 6b.

Quite obviously, in FIG. 4a, steam-generator 6 might be exchanged for any of the steam-generators of FIGS. 6b to 6d. Again, it is possible, without going beyond the scope of the invention, to combine the various embodiments of FIGS. 6a to 6d with the embodiments of FIGS. 4b and 4c.

Figure 7:
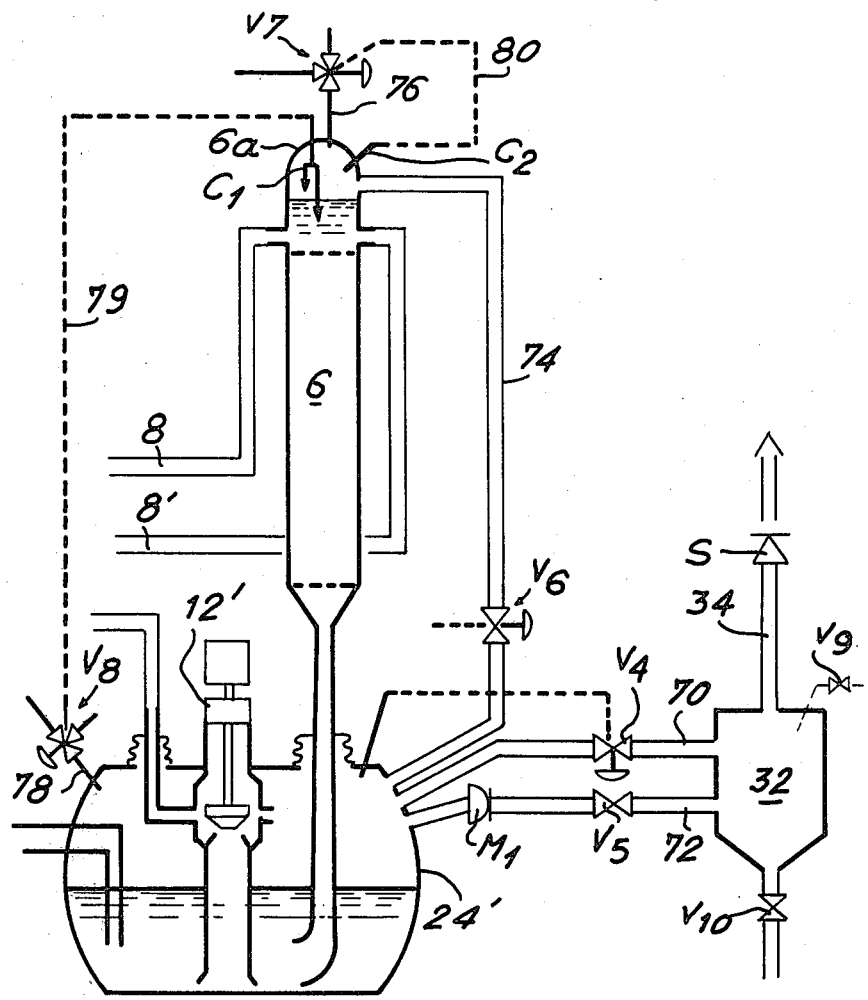
FIG. 7 represents argon circuits for adjusting the levels of sodium.

In FIG. 7 are shown the circuits for argon, or more generally for an inert gas, permitting to ajust the sodium levels in the various tanks of the secondary loop. In said figure, is to be found, first, a duct 70 for rapid depressurization, connecting tank 24' with separator 32. Said duct is of large diameter and its slope is directed towards the storage tank. The temperature is regulated up to the point where said duct opens into separator 32. Said duct is provided with a rapid depressurization valve $V_4$, that opens (either under control or automatically) whenever the pressure within tank 24' is greater than a reference value. Here again is provided an emergency rapid depressurization duct 72, of large diameter and the slope of which is, here again, directed towards the storage tank, said duct connecting tank 24' with separator 32. The temperature is regulated up to rupturable diaphragm $M_1$. Finally, there is provided duct 74 for ensuring the balance of argon pressure between steam-generator pocket 6a and tank 24'. Said duct 74 for the return of the condensate is of large diameter and its slope towards the tank is constant. The temperature is permanently regulated at a value of about 150° C. It may be added that duct 72 can be preferably provided with a valve $V_5$ that is maintained locked-open in normal operation and closes following the rupture of diaphragm $M_1$ so as to avoid the penetration of air into the circuit. The rupture pressure of emergency diaphragm $M_1$ mounted in duct 72 is higher than the pressure of automatic opening of valve $V_4$ mounted in duct 70. If desired, valve $V_6$ for balancing pressure between the storage tank and pocket 6a of the steam-generator can be automatically controlled when, valve $V_4$ being open, the pressure inside of the storage tank is in the vicinity of the pressure in argon pocket 6a.

At the upper portion of said argon pocket 6a, there is an argon inlet duct 76, opening into pocket 6a through a three-way valve $V_7$. The controlled or automatic operation of said valve permits to regulate the pressure inside argon pocket 6a. A further valve $V_8$, mounted in duct 78 for the introduction of argon into storage tank 24', permits to regulate the level of sodium in argon pocket 6a. Valve $V_9$ permits to adjust the introduction of argon into separator 32 so as to regulate the pressure of argon in said tank. Valve $V_{10}$ permits, if desired, to pick up some more or less oxidized sodium withdrawn from separator 32. On stack 34 is to be found a valve S of large section and low calibration pressure, e.g. of from about 0.05 to about 0.1 relative bar. In said figure, $C_1$ designates a sensor mounted in argon pocket 6a and adapted to determine the sodium level in said pocket and, accordingly, to control valve $V_8$ through follow-up linkage 79. Finally, $C_2$ designates a pressure sensor mounted in argon pocket 6a and adapted to control valve $V_7$ through follow-up linkage 80.

The above various argon circuits fulfill the following functions:

(1) filling the secondary loop with sodium from storage tank 24': valve $V_6$ is closed; the pressure regulation (e.g. 1.1 bar) of the generator upper portion is being carried out. By means of valve $V_8$, the storage tank is pressurized, which, by counter-pressure effet, induces the rise of sodium in the loop. Once the level determined by $C_1$ has been reached in the steam-generator, the level regulation acts on valve $V_8$ so as to maintain a constant level in said generator. As for valve $V_7$, it keeps on regulating the pressure of argon pocket 6a to the value of e.g. 1.1 bar.

(2) starting of pump 12'; operation at full load or at partial load: as soon as the pump is in operation (its starting is usually gradual since, for other reasons, pumps of that type are driven by a variable speed motor), the level tends to change in the steam-generator; the level regulation acts on valve $V_8$ accordingly, in particular in such a manner that, at nominal regime, the pressure in the storage tank be lessened by an amount corresponding to the loss of head in the steam-generator.

(3) normal drainage: the pump being stopped, the level regulation is inhibited and valve $V_6$ is opened gradually; the pressures tend to counter-balance between the storage tank and the generator pocket 6a and, accordingly, the level of sodium in the loop is lower and lower as the sodium is sent back into the storage tank and is replaced by storage argon in the upper portion. The regulation due to valve $V_7$ by argon drainage is operated in such a manner that, when the drainage is over, the pressure is uniformly settled at 1.1 bar for instance, or at any other value deliberately selected.

(4) rapid drainage (because e.g. of a sodium leak in the loop): both valves $V_4$ and $V_6$ are fully open. Valve $V_4$ serves to depressurize the storage tank rapidly, while valve $V_6$ permits to obtain a rapid balance of the pressures in the installation, which ensures a rapid drainage of sodium in storage tank 24'.

(5) sodium-water reaction: the hydrogen bubbles developed in the steam-generator tend to repel the sodium on both sides; the generator argon pocket is pressurized, in accordance with its function of ram-effect preventing pad, and so does the argon pocket of the storage tank. However, in view of the large volume of storage tank 24', the pressure therein varies very slowly. Within a very short time, the hydrogen bubbles becoming bigger and bigger induce the downward drainage of all the steam-generator sodium situated lower than the leak. From that moment, the steam and hydrogen from the steam-generator penetrate directly into the storage tank; actually, ram-effects no longer take place, but there is, instead, a gradual rise of the system gas-pressure. With a view to restricting such a pressure rise, it is possible to resort to various procedures, either successively or simultaneously.

(a) the specific leakage detectors, or sensors (noise measurement, measurement of the hydrogen present in the sodium or in the argon of pocket 6a or of tank 24') give the alarm and permit to open valve $V_4$ very soon, so as to depressurize the system. In addition, they permit, by means of appropriate valves, to depressurize the water-steam circuit and isolate the steam-generator at the water inlet and at the steam outlet, according to a known procedure;

(b) pressure, level, and flow rate sensors, by corrolating their readings, give the alarm and induce the same operations;

(c) the pressure within the storage tank reaches a predetermined value which causes valve $V_4$ to open automatically (which, in other words, means that valve $V_4$ acts as a safety valve);

(d) as an ultimate emergency mean, it is possible to provide a rupturable diaphragm $M_1$ over the argon of storage tank 24'.

Should all the above devices fail to work, said diaphragm would finally rupture. Valve $V_5$, normally maintained open (for instance by locking), could then be closed so as to avoid the introduction of air.

The argon circuit shown in FIG. 7 is given merely by way of explanation. Other arrangements, either more simple or more sophisticated, fulfilling the same functions might be resorted to. Said circuit is not shown in its entirety; some portions thereof have been omitted, for instance that portion corresponding to the device for storing the make-up argon, or that portion corresponding to a possible system for recycling argon with a view to reducing the consumption thereof, since such devices are no parts of the loop according to the invention.

FIG. 4d represents a concrete application of the secondary loop according to the invention, such as shown in FIG. 4a. The reference numerals of FIG. 4a have been kept in FIG. 4d. The latter, drawn at the same scale as FIG. 3, clearly indicates what space saving the invention permits with respect to the circuit of the prior art.

Moreover, the drainage system is considerably simplified, since its extra ducts comprise only the drains or orifices 25' situated in the upper portion of the connection between the intermediate exchanger and the pump and capable of being readily connected to argon pocket 6a. The ducts must be installed with a given slope (of from about 3 to 5%) and suitably directed. It is to be noted, moreover, that, in FIG. 4d, the slope has been given a direction permitting to drain the intermediate exchanger almost fully by syphon-effect, which was not possible in the prior art.

FIG. 8 shows a variant of the secondary loop, resorting to an integrated pump-exchanger block 90. The exchanger portion 90a of said block comprises central stack 90b and the annular bundle of exchange-tubes 90c. As for the pump portion 90d, it comprises the free level pump 90e proper with its expansion tank 90f. The secondary sodium penetrates into exchanger 90a via duct 8 and it leaves pump 90d via duct 10''. It is to be noted, however, that the same secondary circuit principle is to be found, here again, since the bottom of steam-generator 90a is in direct communication, through duct 6b, with tank 24', the latter thus constituting at the same time the downstream ram-effect preventing tank. FIG. 8 also shows drainage duct 92 opening into tank 24'. Said duct, provided with valve $V_{11}$ and the diameter of which is very small, is used only for draining pipes 8 and 10'', while the drainage of steam-generator and of expansion tank 90f is carried out through pipe 6b.

In the above-described various embodiments, the pumps used were free level pumps 12', but, in the secondary loop according to the invention, it is just as well possible to use "frozen seal" pumps or electromagnetic pumps.

As already mentioned, FIG. 5a is a half view in axial section of a pump of the "frozen seal" type. Said pump is designated by reference numeral 12''. It comprises casing 12''b, a wheel 12''c and the driving shaft 12''a therefor. There is also provided outer sleeve 12''d, cooled by blades and a natural or forced flow of air, generating "frozen seal" 100 of sodium. That pump also comprises a tubing 12''e for the inlet of an inert used both for preventing said "frozen joint" from being oxidized and for expelling said "frozen seal" once melt, so as to allow e.g., the pump to be dismounted.

FIG. 5b shows a possible embodiment of the secondary loop using pumps 12'' of the "frozen seal" type (or, in some cases, electromagnetic pumps), viz. pumps for which it is not necessary to provide an inert gas pressure for achieving tightness.

In FIG. 5b, pump 12'' is outside of the tank 24'', but it is however in the vicinity thereof so as to occupy a low position. Inlet duct 12''a is dipped in sodium and passes through the tank wall via an expansion sleeve. It is also possible to install the pump directly on the tank according to the arrangement shown at 5d.

Figure 3:
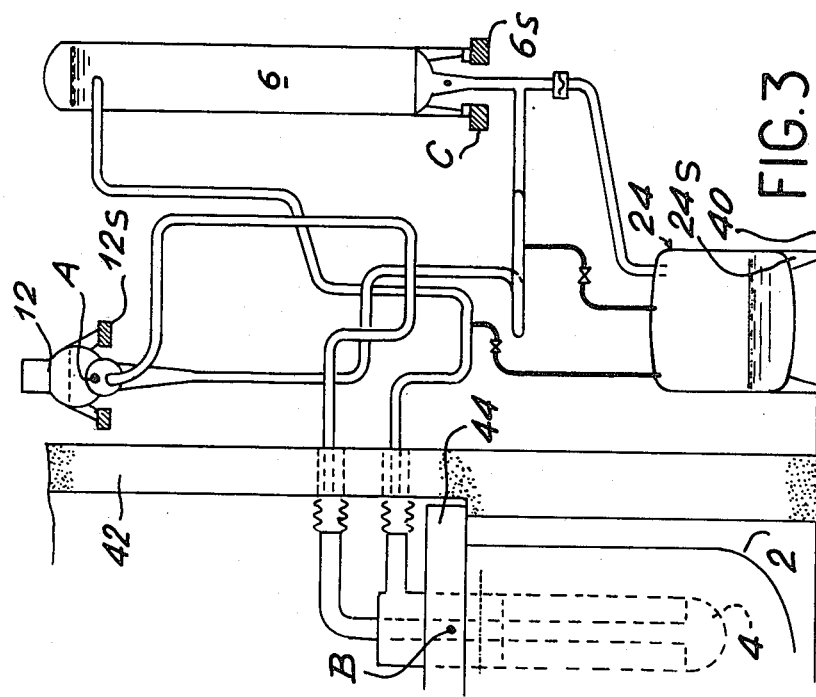
Figure 3:
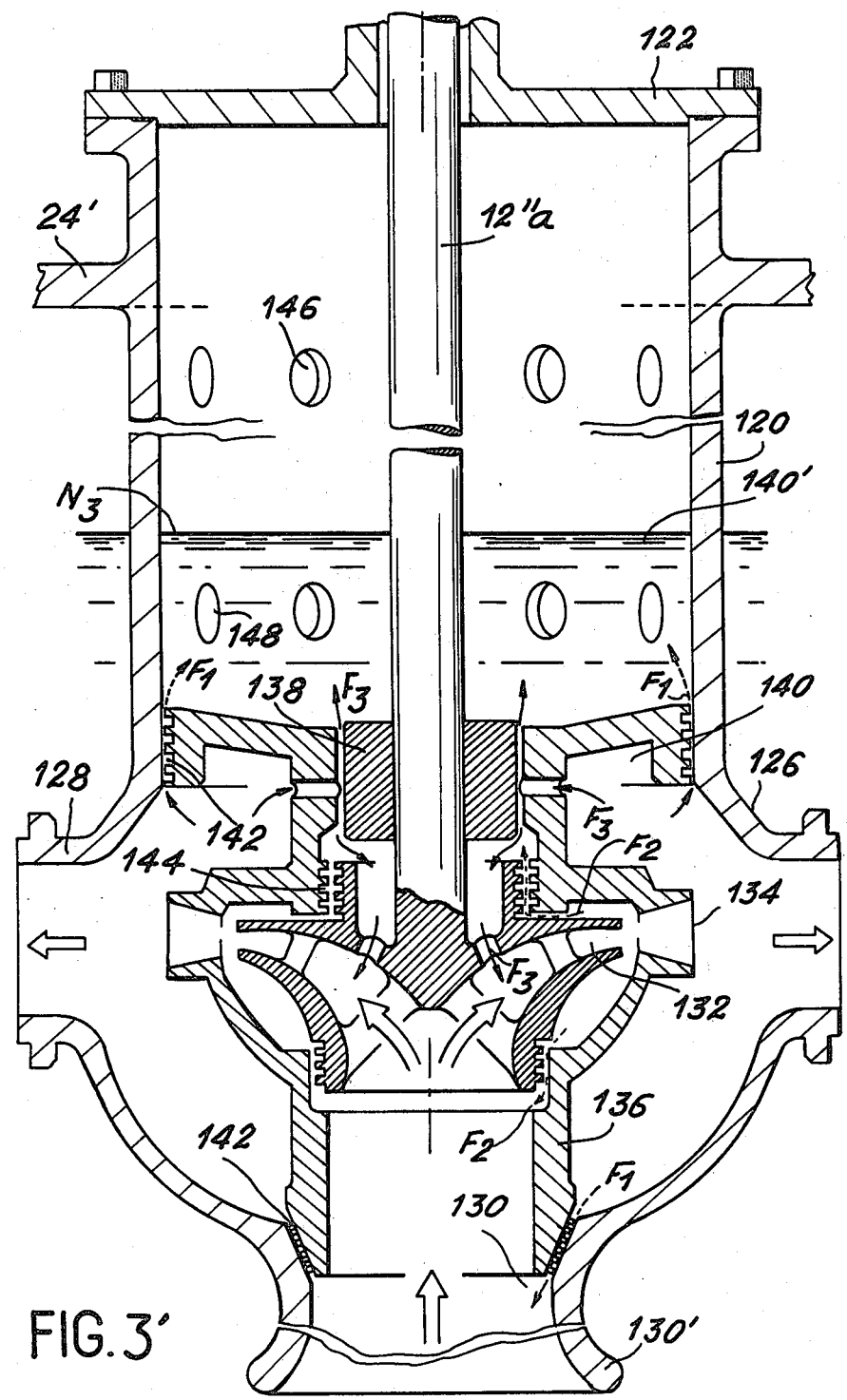

FIG. 5c represents a preferred mounting of pump 12''. That pump can be either of the mechanical type, as shown in FIG. 3', or of the "frozen seal" type, as shown in FIG. 5a, or else of the electromagnetic type, well known in the field of nuclear-reactors cooled by a liquid metal. According to such a mounting mode, the inlet 12''b of pump 12'' is directly connected to the outlet duct 6b of steam-generator 6. That duct is thus, as well as pump 12″, outside of tank 24′. The pump outlet 12″c is directly connected, by means of the back-flow duct, to duct 10′, viz. to the intermediate exchanger or exchangers 4. It is possible, of course, to provide several back-flow ducts. However, the lower extremity of duct 6b is dipped in tank 24″ under the lowest level of the liquid metal.

It will be clearly understood that, according to such a preferred embodiment, the liquid metal issuing from steam-generator 6 is directly introduced into pump 12″ via duct 12″b. Actually, in other words, the secondary liquid metal circuit does not contain tank 24′. Therefore, in normal operation, there is no circulation of liquid metal in tank 24′. Such an arrangement is advantageous for the construction and operation of the secondary loop. Moreover, since the lower extremity of duct 6b is dipped in tank 24′ and opens under the lowest level of liquid metal, said tank 24′ is in a position to act both as an downstream ram-effect preventing tank and as an expansion tank.

It is to be noticed that the embodiment of FIG. 8 ensures the same advantage. In view of the fact that the pump is integrated at the upper portion of the exchanger, the liquid metal does not flow through tank 24′. However, duct 6b provides a communication between said tank 24′ and the secondary loop.

Figure 10:
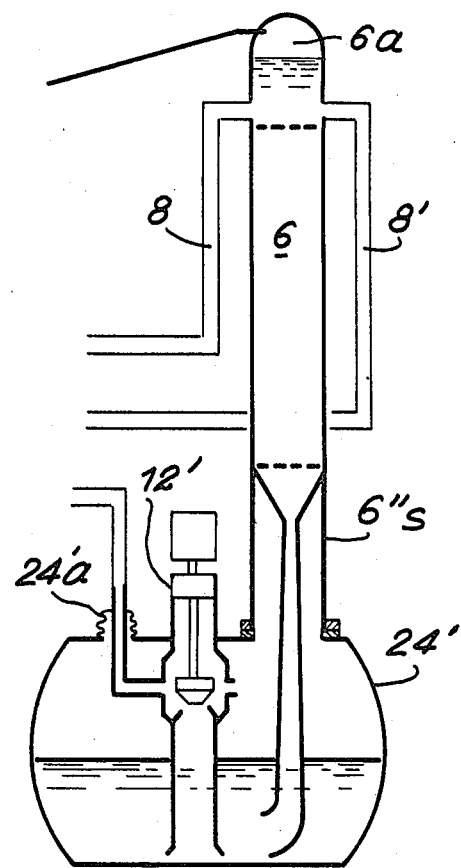
FIG. 10 is a partial view of the secondary loop, showing an embodiment in which the steam-generator is directly supported by the storage tank.

FIG. 10 shows a further embodiment of the circuit that distinguishes from the others only by the supporting means for the steam-generator. The generator envelope is extended by a supporting sleeve 6′s, welded to the upper wall of tank 24′. One thus dispenses with expansion sleeve 24′a.

Quite obviously, it is possible, without going beyond the scope of the invention, to combine the various variants described concerning the various parts of the secondary loop. In particular, it is possible to combine the various types of steam-generators associated to their upstream ram-effect preventing tank, with the various types of pumps and their various modes of installation.

Figure 9A:
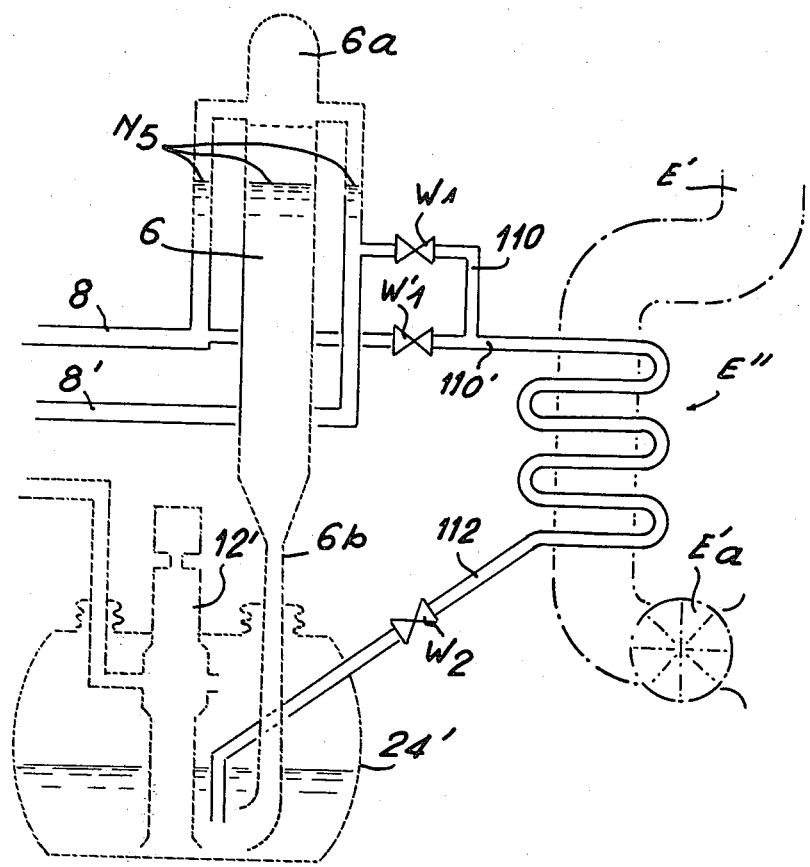
FIGS. 9a and 9b are partial views of the cooling secondary loop, showing two embodiments of the emergency cooling circuit.
Figure 9B:
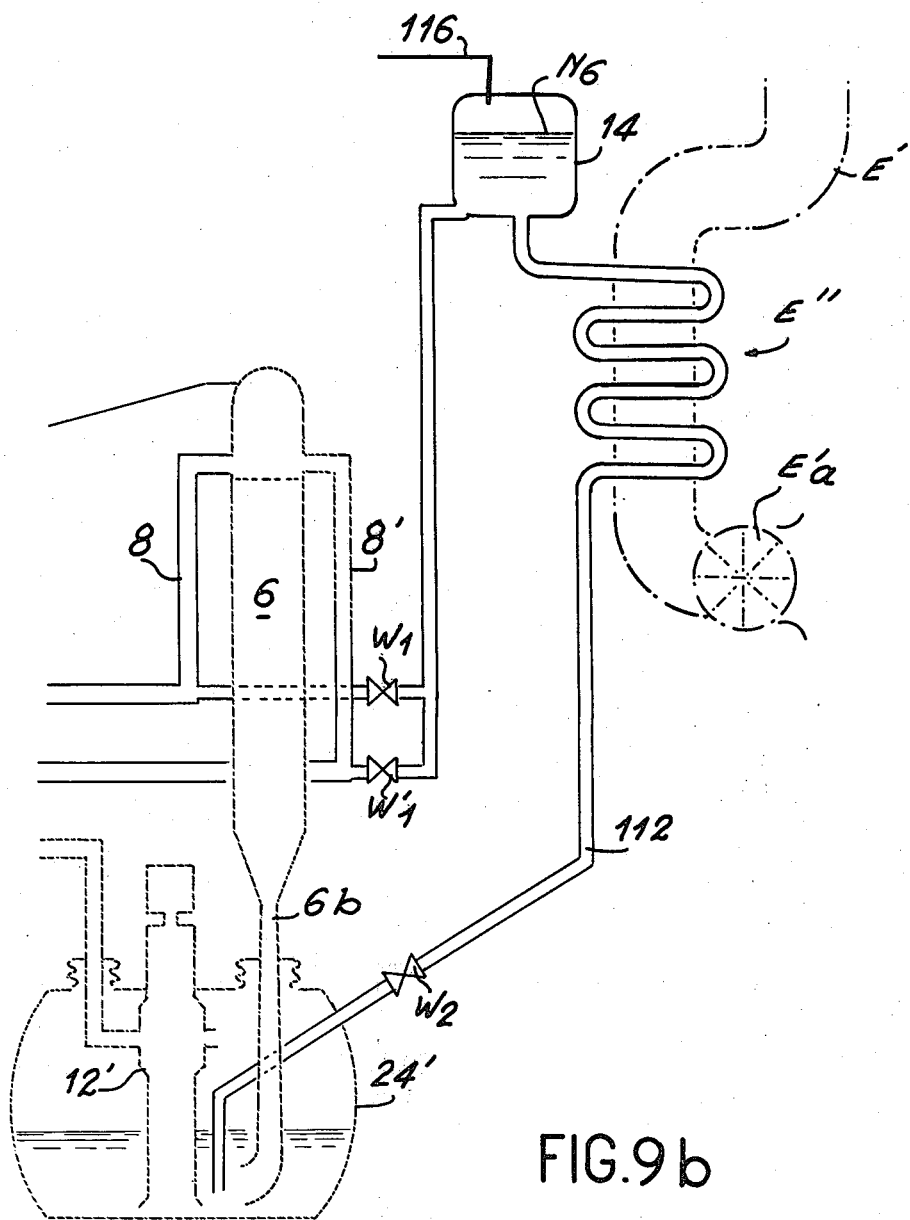

In FIGS. 9a and 9b are represented two preferred embodiments of the emergency cooling circuit. As already mentioned, it is often useful to provide such a circuit in the secondary loop.

Figure 2:
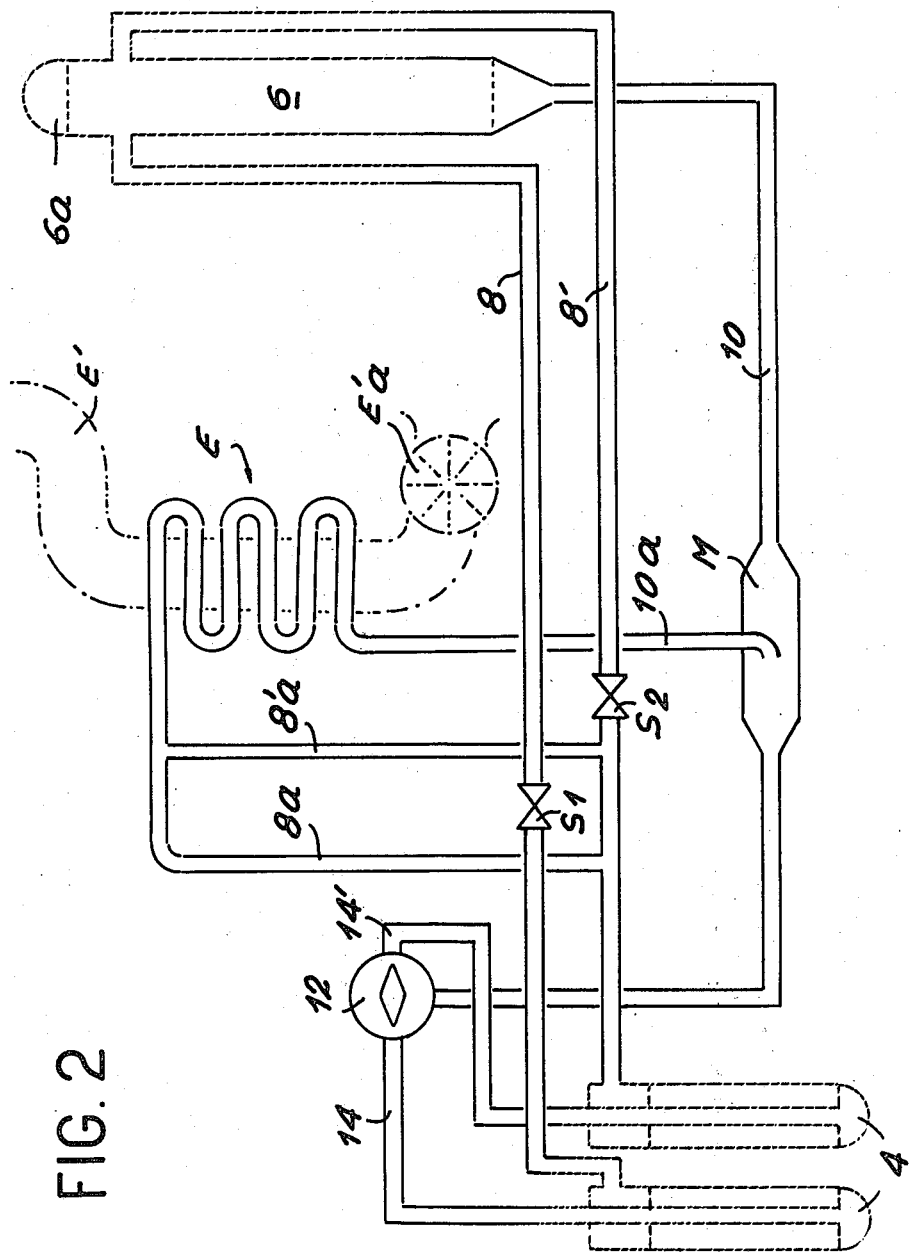

In FIG. 9a, the emergency exchanger consists, by way of example, of a coil E″ cooperating with an air stack E′, similar to that of FIG. 2. The inlet of said coil E″ is connected to ducts 8 and 8′ through small diameter pipes 110 and 110′, provided with small diameter valves $W_1$, $W'_1$. The outlet of coil E″ is constituted by tubing 112, provided with small diameter valve $W_2$. The lower extremity of tubing 112 opens into the sodium of storage tank 24′. It is to be noted that the upper points of the emergency circuit are constituted by the junctions of ducts 110 and 110′. Moreover, the various elements of the emergency circuit must meet the following requirements as regards their position:

the upstream junction 110, 110′ of exchanger E″ is situated on the main piping 8, 8′ for the introduction of sodium into the steam-generator, at a level lower (e.g. by a few meters) than that of the point where main piping 8, 8′ opens into said steam-generator. Accordingly, it is possible, by lowering the sodium free level in the generator, to undrown the points where main piping 8, 8′ opens into the generator, without undrowning junctions 110, 110′ of exchanger E″.

recovery junction 112 of the exchanger is itself transferred downstream of the generator, to a point the level of which must be lower than, or the same as, that of the upstream junction. A specially advantageous arrangement, shown in FIG. 9a, consists in transferring the point where recovery piping 112 opens into storage tank 24′, upstream of the suction piping of pump 12′, in an area of highly turbulent flow. Therefore, no mixer has to be installed on the piping; such a mixer is replaced by the storage tank 24′ itself.

emergency exchanger E″ is keyed at any level between the thus-determined upstream and downstream junctions. However, if it is desired to provide a thermosyphon in the emergency exchanger, it will have to be installed at a level fairly above that of intermediate exchangers 4.

The operation of the system is as follows:

When the generator is in operation, valves $W_1$ and $W_2$ are closed; the circuit of emergency exchanger E″ is constituted by argon, therefore stopped, and pre-heated in order that, at any moment, it may be filled with sodium without the risk of being choked because of the solidification of sodium at any point. Such a safety measure is also necessary in view of a possibility of slight leaks in valves $W_1$ and $W_2$: should sodium penetrate into the circuit and into emergency exchanger E″, it would remain in the liquid state. During the downtimes of generator 6 (steam and water exchanged for an inert gas, e.g. nitrogen), by opening valves $W_1$ and $W_2$, one fills up the related circuit.

It can then be used in two various ways:

(a) in parallel with generator 6: pump 12′ of the circuit providing a large flow-rate, a portion of the latter passes through generator 6 (without being cooled), while the other portion thereof passes through emergency exchanger E″ in parallel and is cooled therein. At the point of recovery, the two sodium streams at different temperatures are fairly mixed, since the flow-rate and turbulence are high at that point.

(b) as a thermosyphon: pump 12′ of the circuit is then stopped. With a view to forcing the whole thermosyphon flow-rate through the emergency exchanger, it is necessary, with the help of e.g. valve $V_7$ (FIG. 7), to introduce argon into the generator pocket until the free level $N_5$ of the pocket undrowns the points where the sodium inlet pipes 8 and 8′ open into the generator (of course, without undrowning the upstream junction of the circuit of emergency exchanger E″, situated at a lower level). Sodium no longer flows through the generator and the whole contents of the thermosyphon feeds said emergency exchanger.

FIG. 9b shows a second embodiment of the emergency circuit. The only difference with FIG. 9a lies in the fact that emergency exchanger E″ constitutes the upper point of the emergency circuit. It is then necessary to provide a venting device. The latter can preferably be constituted by a small expansion tank 114, the free level $N_6$ of which can be adjusted by introducing argon via duct 116.

The arrangement represented in FIG. 9b can work according to any of the two previously described modes. The only differences relate to the way of carrying out the filling operation and the operation of the related argon circuit.

(a) filling operation: once the level and pressure regulations of the generator argon pocket 6a have been inhibited, they are transferred to the small tank 114 of the emergency exchanger circuit (duct 116). By opening valves $W_1$ and $W_2$, which can be dispensed with, but however act as safety devices, the filling of that circuit is automatically obtained by counter-pressure effect. The level $N_6$ of small tank 114 controls the pressure of argon in storage tank 24'; the pressure of argon in small tank 114 is adjusted to, e.g., 1.1 bar.

(b) operation when pump 12' of the main circuit is running: the above regulation fulfills its function so as to compensate for the variations in loss of head likely to result from variations in the pump flow-rate.

With a view to preventing the undrowning of the points where main pipes 8 and 8' open into generator 6, it is possible to regulate the sodium level by means of argon exhaust or inlet valve $V_7$, to pocket 6a of the generator (where pressure is free).

(c) operation as a thermosyphon: in the final step of the filling operation, argon must be injected into pocket 6a of generator 6, in order to lower level $N_6$ and undrown the opening points of main pipes 8, 8'. The operation is then as previously described. As in the case of FIG. 9a, it might prove useful to regulate the level of the generator argon pocket 6a in order to prevent it from rising up again unexpectedly, which would lead to by-pass emergency exchanger E". Care must also be taken of preventing said level from being lowered to the point of undrowning the upstream junction of emergency exchanger E". To that end, a rough regulation will be sufficient, either by means of an extra level-sensor in the generator pocket, or by using another reference value for regulating the pressure of the generator pocket 6a, viz. a reference value equal to the pressure of the argon pocket of small tank 114 (e.g. 1.1 bar), increased by a pressure equivalent to the height of sodium between the two pockets 6a and 114.

The arrangement represented in FIG. 9b, although more sophisticated than that of FIG. 9a, however has the advantage of permitting the operation as a thermosyphon, even if the steam-generator is installed lower than the level of intermediate exchangers 4. In such a case, when emergency exchanger E" is in operation, the static pressure within storage tank 24' is higher than when the generator alone is in operation, since the sodium must be brought to a higher level than that of the head of generator 6. The corresponding pressure increase, e.g. 1 or 2 bars, is perfectly admissible, taking into account the margins to be kept when the generator is in operation, for withstanding the sodium-water reaction. Indeed, such an overpressure of one or two bars, necessary for the operation of emergency exchanger E", is then taken in those margins reserved for the sodium-water reaction, the latter, in such a case, being no longer to be feared, since the steam generator is under a nitrogen atmosphere and, therefore, absolutely devoid of water or steam.

If the emergency circuit is not expected to function as a thermosyphon, then the arrangement of FIG. 9a is preferable, though it necessarily requires valves $W_1$ and $W_2$ between the loop and the storage tank.

However, even should said valves $W_1$ and $W_2$ happen to be slightly leaky, the level and pressure regulations would compensate for sodium losses.

Figure 11:
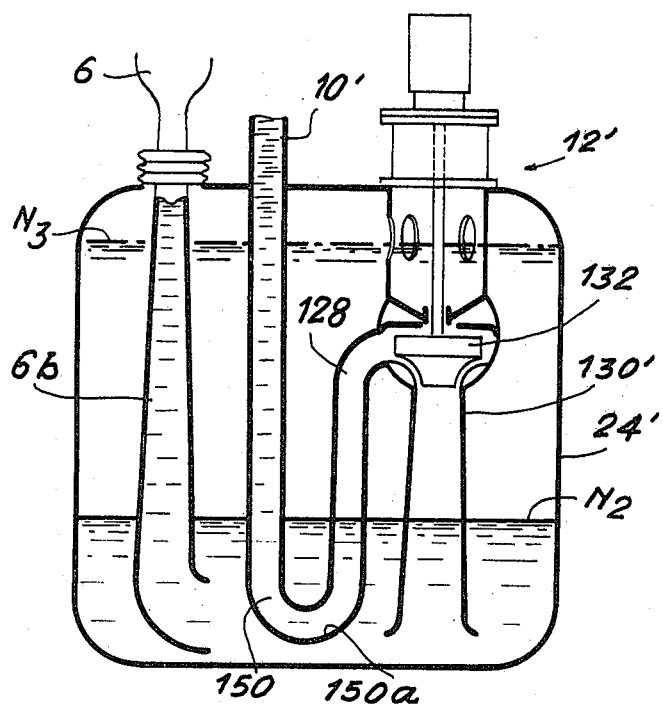
FIG. 11 is a vertical cross-section of a mechanical pump, showing the first mode of protection against the upward movement of the gas bubbles.

In FIG. 11 is shown a first improved embodiment permitting to dispense with the rising of argon into the sodium circuit of the secondary loop, and, more precisely, into back-flow duct 10'. FIG. 11 shows the lower portion of steam-generator 6, with outlet duct 6b opening into the bottom of storage tank 24' and, in any case, lower than the lowest level $N_2$ of liquid sodium in said tank.

There is also represented, in said figure, pump 12' with its inlet tubing 130' dipped into tank 24', lower than the lowest level $N_2$ of sodium. In pump 12', the wheel 132 and the sodium back-flow nozzle 128 are shown diagrammatically. According to said first mode of operation, a portion of a cranked tube 150 is mounted between the pump outlet duct 10' and the pump nozzle 128. That tube is so mounted that its lowest point 150a be at a lower level than the lowest level $N_2$ of the liquid metal in storage tank 24'.

In view of the cranked shape of the pump back-flow tubing in the vicinity of the tank bottom, it is unvoidable that, sooner or later, operation leaks $F_1$, $F_2$ or $F_3$ will unprime the pump; however, the level will be stabilized in the downward leg of the back-flow tubing and the loop will remain filled with sodium, without the necessity of oversizing the argon regulation. In such a device, the mechanical pump cannot be re-started without precaution, since said pump is absolutely unprimed. A possible method may consist in inducing a rapid initial drainage, permitting to expel towards storage tank 24', the argon trapped in the pump, in the downward portion of the back-flow piping and in the pump suction piping. One causes then the pump to start at a low speed in order to improve the venting of the loop (through the venting means in high position); then, the level and pressure regulations being put in operation again, the complementary filling of the loop is obtained automatically.

Figure 12:
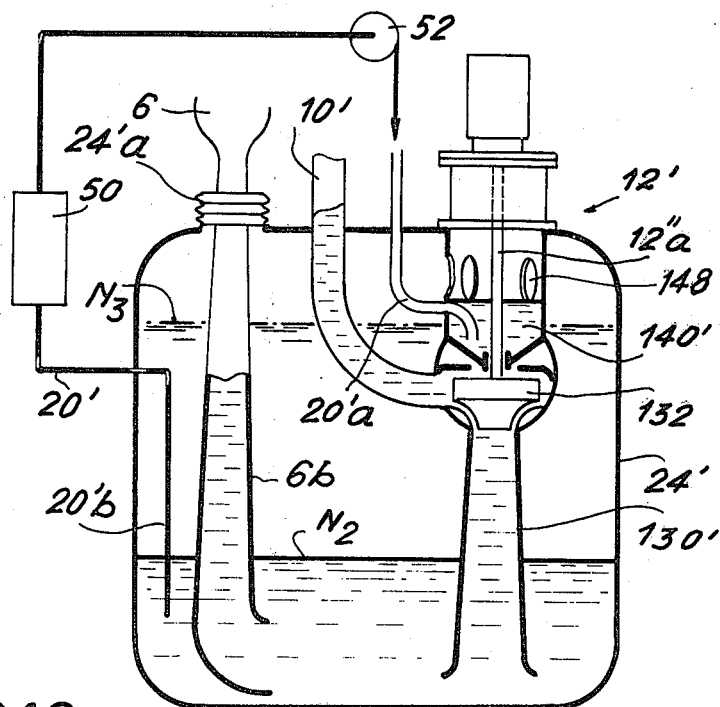
FIG. 12 is a view similar to FIG. 11, corresponding to the second mode of protection.

FIG. 12 represents an improved second embodiment, comprising the same elements as in FIG. 10, viz. Pump 12' with its long inlet tubing 130' extending lower than level $N_2$, its wheel 132 with its short shaft 12" and its liquid metal tank 140', downstream of the hydrostatic bearing. According to that embodiment, the extremity 20'a of the associated circuit 20' (said circuit, if need be, being also used for purification) is connected to the pump and, more precisely, to tank 140° provided in the supporting sleeve of the pump casing. Of course, said associated or dependent circuit 20' comprises a further picking up extremity 20'b in storage tank 24' the latter extremity being lower than the lowest level $N_2$. In addition to a possible purification device 50, said circuit contains a continuously operating pump 52, preferably of the electromagnetic type, so that liquid sodium is permanently picked up in the lower portion of storage tank 24' and sodium liquid is permanently re-injected into the upper portion of pump 12'. The sodium is thus recycled in the pump casing, at a level higher than the upper level of the hydrostatic bearing, and more generally higher than the level of any of the leaks $F_1$, $F_2$, $F_3$ causing the pump high pressure-portion to be in communication with the argon atmosphere of the storage tank.

When pump 12' is in normal operation, the operational leaks are added to the sodium flow provided by associated circuit 20', said circuit, as mentioned above, comprising a small special pump 52, usually of the electromagnetic type, providing the flow-rate required for purification. The upper pump casing is filled with sodium up to the level of the overflow windows 148 provided in pump-supporting sleeve 120.

During the down-times of the pump, a portion of the sodium provided by purification will be sucked through the passages for operational leaks. The excess of sodium will be expelled as usual by the overflow, provided of course that the purification flow-rate be greater than the flow-rate sucked by the operational leaks. Such a requirement can be met easily, taking into account the values usually adopted for the purification flow-rate, e.g. a few scores of liters per second. Indeed, the flow-rate sucked through operational clearances generally corresponds to the flow-rate generated by the action of gravity through a passage section equal to the overall section of the operational leaks under a hydraulic head of a few meters (level difference between the operational leaks and the free surface of the storage tank. Such a flow-rate remains moderate, e.g. from a few liters to a few scores of liters per second. By means of the trick disclosed above is obtained a sodium pad over the operational leaks. So long as said pad is present, the leaks keep on sucking sodium and, therefore, any penetration of argon bubbles into the pump and, from the latter, into the circuit, is avoided. Therefore, the unpriming of the pump and the gradual drainage of the circuit are avoided. Such incidents become quite rare, since their occurrence implies that main pump 12' and purification pump 52 must simultaneously come to a stop in an unforeseen manner. Besides, such an occurrence would not necessarily entail the unpriming and the drainage of the loop. Indeed, if, when main pump 12' is stopped, purification pump 52 is also stopped or comes to a stop for a limited duration, there occurs an initiation of the loop drainage. Said initiation is slow and can be made still slower through the regulation of the sodium level of argon pocket 6a of steam-generator 6, according to the previously described procedure, even if the argon circuit, not being oversized, is insufficient for providing the flow-rate required for accurately making up for the argon leaks through the pump. To the extent such an operation can be considered as very rare, any disrespect to the above mentioned rule of the art is admissible. However, in order that such an operation be possible and that the normal conditions be again in force when the purification pump is restarted, the secondary circuit and main pump 12' must be specially designed; it is necessary that the argon bubbles penetrating into the pump be permanently capable of escaping upwardly by gravity. To that end, it is only sufficient to give a sufficient slope and a suitable orientation to the internal structures of the pump and to back-flow pipings 10'. Indeed, if such is not the case, and in particular if the circuit is designed according to the principle of the above described first variant (FIG. 11), once the pump has been unprimed, the operational leaks are no longer sucked; if, under such conditions, purification pump 52 is again in operation, and, accordingly, reconstitutes the sodium pad above the operational leak orifices, the head of said pad will be insufficient for eliminating the argon pocket trapped in the pump and under the latter. For causing the pump to start again, it will be necessary to proceed as in the first embodiment (FIG. 11). Whether one resorts to the first improvement or to the second one or else to a combination of both (with, in the latter case, the drawback just mentioned), the filling of the initially empty loop by means of the initially full storage tank can be easily carried out according to the same procedure in all cases. Indeed, as already mentioned, when the tank is empty, the pump is fully drowned and, therefore, primed, even in the case of the first improvement, since, in that case, the upper point constituted by the pump is drained of any amount of argon it may contain, towards the argon atmosphere of the storage tank, through the operational leaks. In the case of the second improvement, the drainage is continuous, since slopes have been provided for the pump internal members and for the back-flow piping, said slopes allowing the argon bubbles to come back by gravity to the upper point of the loop (viz. The argon pocket 6a of steam-generator 6a).

Under such conditions, the pump can be caused to start in a perfectly safe manner. The rotation speed thereof for a substantially zero flow-rate will have to be adjusted in such manner that it provides a back-flow head slightly greater than the interval between the level of operational leaks and the level reached by the free surface of the tank sodium once the loop has been filled. Then, according to the method described in the main chapter, the storage tank is caused to be gradually pressurized, so as to cause the sodium to rise in the loop, by a counter-pressure effect. During that operative step, the pump is maintained in rotation and, therefore, it provides a slight overpressure upstream of the operational leaks (viz. on the inner side with respect to the pump). Therefore, these leaks propell a certain amount of sodium towards the argon atmosphere of the storage tank, as during a normal operation of the installation; no argon is introduced into the pump.

Quite obviously, it is possible to combine these first two ways of protecting the secondary circuit as regards the introduction of inert gas.

It is to be noted that it is possible to abstain from using such a starting procedure, in the case of the second mode of carrying out the improvement, either applied alone or in combination with the first mode. In such a case, it is necessary that the purification pump be previously started; the sodium pad above the operational leaks is fed permanently for all the duration of the filling operation and it is partially sucked through the operational leaks, which, here again, prevents any penetration of argon.

Figure 13:
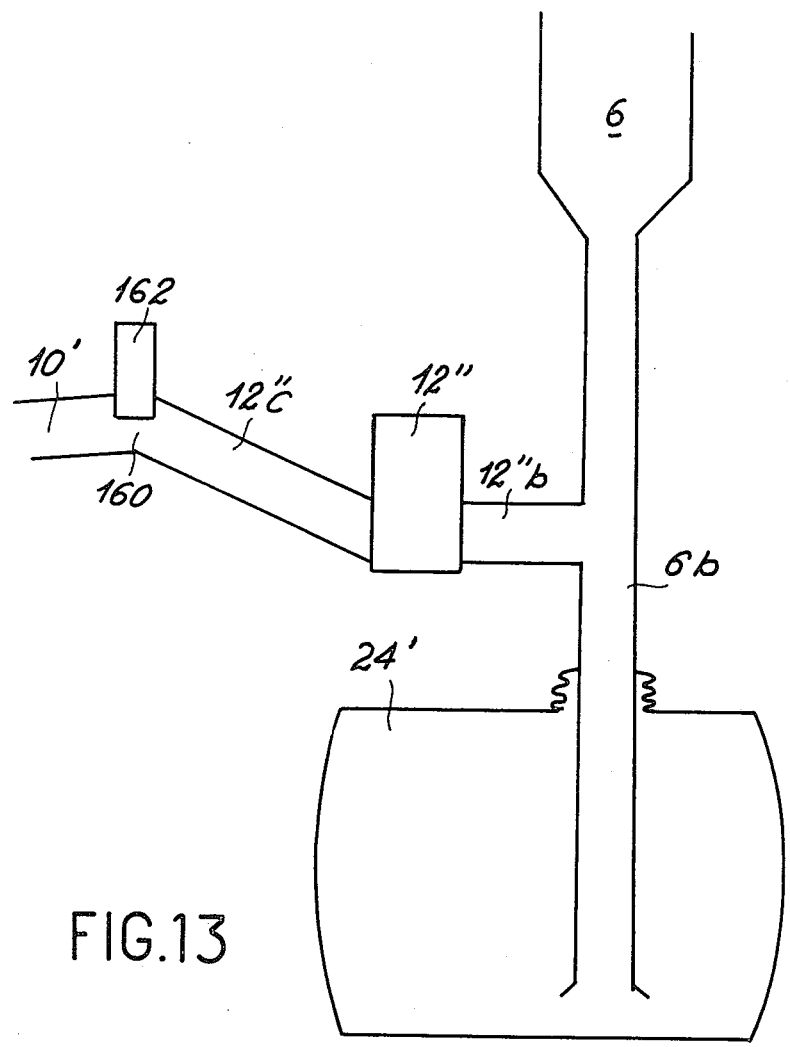
FIG. 13 is a simplified view of a third mode of protection against the upward movement of gas bubbles, in the particular instance where the pump is outside the storage tank.

FIG. 13 represents a third embodiment of the device adapted to ensure protection with respect to any tendency of the gas bubbles to rise in the sodium secondary circuit, should pump 12" be stopped. That device is applied to the case of FIG. 5c.

Back-flow duct 12"c of pump 12" comprises an upper point 160. Duct 12'c between the pump outlet and said upper point 160 has a sufficient slope and a suitable orientation allowing the gas bubbles to escape and to reach upper point 160 by gravity. A vent 162 permits the exhaust of that gas. However, in order to maintain the requested pressure in tank 24', an equivalent amount of gas is re-injected into tank 24', e.g. as indicated in FIG. 7.

Quite obviously, said device may also be used if pump 12" is dipped in the tank, in which case back-flow duct 12"c passes through the upper wall of tank 24'. Again, that protective device may be combined with those previously described.

In short, the improvements suggested aim at still more improving the possibility of reducing the cost of a cooling secondary circuit, and of improving its realiability and its safety and also of rendering the working thereof easier, by avoiding that, should the main pump, assumed to be provided with the shortest possible shaft, be stopped in an unforeseen manner, said pump be unprimed and that the loop be gradually drained. To that end, the improvements suggested consist either in a particular design of the back-flow pipes of the pump or in an appropriate installation of the piping for repelling the sodium provided by purification and sucked by a pump (e.g. an electromagnetic pump), independent of the main pump. It must be added that, in each of said three modes of operation, it is endeavoured to reduce the operational leaks of liquid metal in the pump, to the largest possible extent.

The main advantage of the circuit for evacuating the residual power, or emergency circuit, according to the improvements suggested, is definitely as follows: with respect to the usual devices, the devices according to the invention permit to dispense with large diameter valves in the main pipings and also with mixers which, in usual systems, are rendered necessary by the confluence, in the main piping, of two sodium streams at different temperatures.

It follows from the above description that the secondary loop forming the object fo the invention has several advantageous features, some of which are likely to provide a final remedy to some of the unfavorable features of normal secondary loops. In other cases, the loop according to the invention provides a substantial improvement. To sum up, the various advantages provided by the secondary loop according to the invention are as follows:

that loop permits, in a perfectly safe manner, to place an ordinary free surface pump in low position, therefore with a good NPSH coefficient, thus allowing a higher speed of rotation, a wheel of smaller diameter, a less heavy driving mode and, finally, less expensive a motor-pump unit;

it permits to reduce the number of operational tanks in the loop: if the steam-generator is provided with an argon pocket, a single tank is sufficient, said tank performing several functions: storage, expansion, ram-effect preventing tank and recovery of contaminated sodium;

it permits to place the circuit heavy elements in a low position (the above storage tank and the pump), which promotes their support, in particular to withstand seismic stresses;

it promotes the reduction of the length of large diameter pipings (main pipings);

it permits to simplify some auxiliary devices and even to dispense with some of them, e.g. drainage valves and pipings, level balancing circuit, overflow circuit, etc.; in addition, it renders the filling and draining operations easier;

it permits to reduce the importance of the rupturable diaphragms considerably or even to dispense with same, said diaphragms being expensive and entailing obligations as regards exploitation (periodical maintainance) with the risk of incidents likely to have important sequels as regards safety (sodium leaks and fires, loss of the normal circuits for the evacuation of power);

it permits to withstand sodium-water reactions readily;

for all the above reasons, it permits to design a system that is less bulky, less high and, therefore, less cumbersome and less costly to install;

in view of the above reasons, it leads to a loop containing a smaller amount of sodium with, accordingly, a favorable effect on the size of the storage tank and, more generally, on the importance of various devices: pre-heating devices, heat-insulating devices, supporting devices, etc.;

finally, for all the above reasons considered together, the secondary loop according to the invention lessens the importance of the control to be associated to thes systems.

What is claimed is:

1. A secondary coolant circuit for nuclear-reactors of the liquid-metal cooled type, said circuit comprising at least one intermediate exchanger mounted in the vessel of said reactor, outside said vessel a steam-generator for the exchange of calories between the secondary liquid-metal flowing through said secondary circuit and water-stream, at least one pump for circulating said secondary sodium and one tank for storing said secondary liquid-metal and recovering those products generated by a possible liquid-metal-water reaction in said steam-generator, said liquid-metal being likely to occupy the lowest possible level in said tank, said secondary coolant circuit being characterized in that said tank is situated at the lowest possible level in the nuclear installation, in that the lower extremity of the liquid-metal outlet duct of said steam-generator is directly dipped into said tank, in that, in said tank above the liquid-metal, is maintained an inert gas cover at such a pressure that it balances the liquid-metal pressure in the whole secondary loop, said tank, in addition, acting as the downstream ram-effect preventing tank for said steam-generator and as an expansion tank during the temperature variations of said liquid-metal, and in that the rotor of said pump is situated above said lowest level.

2. A circuit according to claim 1, wherein the said circulating pump is of the free level type and the said pump is situated in said tank, the inlet of said pump being directly dipped into the liquid-metal contained in said tank, whereas the outlet of said pump is directly connected to said intermediate heat-exchanger or to each of said intermediate exchangers.

3. A circuit according to claim 1, wherein the said pump is of the electromagnetic or "frozen seal" type, and said pump is situated just above said tank, the inlet duct of the pump being dipped into the liquid-metal of said tank, whereas the outlet duct is directly connected to the intermediate exchanger or exchangers.

4. A circuit according to claim 1, wherein the inlet of said pump is connected to the outlet duct of said steam-generator upstream of said tank, and wherein the outlet of said pump is directly connected to the intermediate exchanger or exchangers, the said pump being outside of said tank.

5. A circuit according to claim 1, wherein the said pump is integrated to said steam-generator and situated in the upper portion of its casing or envelope, said steam-generator being provided with a central stack through which flows the secondary metal after it has passed though the exchange bundle, the said central stack constituting the inlet duct of said pump, the outlet of said pump being directly connected to said intermediate exchanger or exchangers.

6. A circuit according to any of claims 1 to 4, wherein the said steam-generator is provided, at the upper portion of the envelope thereof, above the bundle of exchange tubes, with means for injecting an inert gas and for regulating the pressure thereof, so as to define a free level of secondary liquid-metal, the upper portion of said envelope thus constituting an upstream ram-effect preventing tank for the said steam-generator.

7. A circuit according to any of claims 1 to 4, wherein the said steam-generator comprises an enclosure situated above the envelope thereof and communicating therewith by means of a duct, the said enclosure comprising means for injecting thereinto a pressurized inert gas for regulating the free level of liquid-metal in said enclosure, the latter constituting an upstream ram-effect preventing tank for the said steam-generator.

8. A circuit according to any of claims 1 to 7, wherein the said steam-generator is supported by a sleeve directly resting on the upper wall of said storage tank, the outlet duct of said steam-generator being inside said sleeve.

9. A circuit according to claim 2, wherein the liquid-metal occupies, in the storage tank, a lower level whenever said secondary circuit is filled with said liquid-metal and an higher level whenever said secondary circuit is empty, characterized in that the wheel of said mechanical pump is mounted, at the extremity of the shaft thereof, at an intermediate level between said lower level and said higher level, in that the said suction duct of the pump opens lower than said lower level and in that said pump is provided with protective means serving, when the liquid-metal is at said lower level, to prevent the gas surmounting said liquid-metal from penetrating into the back-flow duct of said pump, with the risk of unpriming the latter, when it is brought to a stop, either deliberately or unwillingly.

10. A circuit according to claim 9, wherein the said protective means consist in the fact that the said back-flow duct forms an elbow and has, in said storage tank, a low point situated lower than said lower level.

11. A circuit according to claim 9, comprising a dependent circuit provided with its own pump, wherein the liquid-metal flows, the inlet of said dependent circuit opening into the storage tank lower than the lower level, wherein the protective means consist in that the outlet of said dependent circuit opens into the pump casing above said wheel, the flow-rate of said purification dependent circuit being greater than, or equal to, the flow-rate of the operational leaks of said pump, when the latter is stopped.

12. A circuit according to claim 11, wherein the said dependent circuit is the purification circuit.

13. A circuit according to claim 10, wherein are also provided protective means according to any of claims 11 and 12.

14. A circuit according to any of claims 2 to 4, wherein the back-flow duct or ducts connecting the outlet of said pump to said intermediate exchanger comprises an upper point, the slope of the portion of said conduit between the pump outlet and said upper point being sufficient and suitably directed to allow the gas bubbles likely to penetrate into said pump to be drained and return to said upper point by gravity, said upper point is provided with a vent or orifice permitting said bubbles to escape, and means are provided for introducing an equivalent amount of gas into said tank so as to maintain said pressure.

15. A circuit according to claim 14, wherein are also provided protective means according to any of claims 10 to 12.

* * * * *